(12) United States Patent
Aylward et al.

(10) Patent No.: US 7,780,330 B2
(45) Date of Patent: Aug. 24, 2010

(54) ELONGATED ILLUMINATORS CONFIGURATION FOR LCD DISPLAYS

(75) Inventors: Peter T. Aylward, Hilton, NY (US); Robert P. Bourdelais, Rochester, NY (US); Qi Hong, Rochester, NY (US); John M. Palmeri, Hamlin, NY (US); Leonard S. Gates, Holley, NY (US)

(73) Assignee: Rohm and Haas Electronics Materials LLC, Marlborough, MA (US)

( * ) Notice: Subject to any disclaimer, the term of this patent is extended or adjusted under 35 U.S.C. 154(b) by 268 days.

(21) Appl. No.: 11/749,171

(22) Filed: May 16, 2007

(65) Prior Publication Data
US 2008/0285310 A1    Nov. 20, 2008

(51) Int. Cl.
*G02B 6/10* (2006.01)
(52) U.S. Cl. .................. 362/613; 362/612; 362/608; 362/610; 362/620
(58) Field of Classification Search .......... 362/600–634
See application file for complete search history.

(56) References Cited

U.S. PATENT DOCUMENTS

| | | | |
|---|---|---|---|
| 5,400,224 A | 3/1995 | DuNah et al. | |
| 5,499,112 A | 3/1996 | Kawai et al. | |
| 5,835,661 A | 11/1998 | Tai et al. | |
| 5,857,761 A | 1/1999 | Abe et al. | |
| 6,714,185 B2 | 3/2004 | Kim et al. | |
| 6,752,507 B2* | 6/2004 | Wang et al. | 362/619 |
| 6,789,921 B1 | 9/2004 | Deloy et al. | |
| 6,992,335 B2* | 1/2006 | Ohkawa | 257/98 |
| 7,039,286 B2* | 5/2006 | Leu et al. | 385/129 |
| 7,125,154 B2* | 10/2006 | Blanc | 362/620 |
| 7,220,038 B2* | 5/2007 | Yamashita et al. | 362/606 |
| 7,262,916 B2* | 8/2007 | Kao et al. | 359/599 |
| 2003/0123246 A1 | 7/2003 | Parker | |
| 2005/0231973 A1 | 10/2005 | Cassarly et al. | |
| 2006/0152944 A1 | 7/2006 | Nakayoshi et al. | |
| 2006/0221592 A1 | 10/2006 | Nada et al. | |

* cited by examiner

*Primary Examiner*—Anabel M Ton
(74) *Attorney, Agent, or Firm*—Edwin Oh

(57) ABSTRACT

A solid waveguide comprises opposite TIR surfaces further comprising:
  a) at least one light input surface for coupling light from a solid state light source;
  b) at least one mixing section;
  c) at least one light emitting surface; and
  d) a desired pattern of light redirecting features located on one TIR surface or between the TIR surfaces.

35 Claims, 37 Drawing Sheets

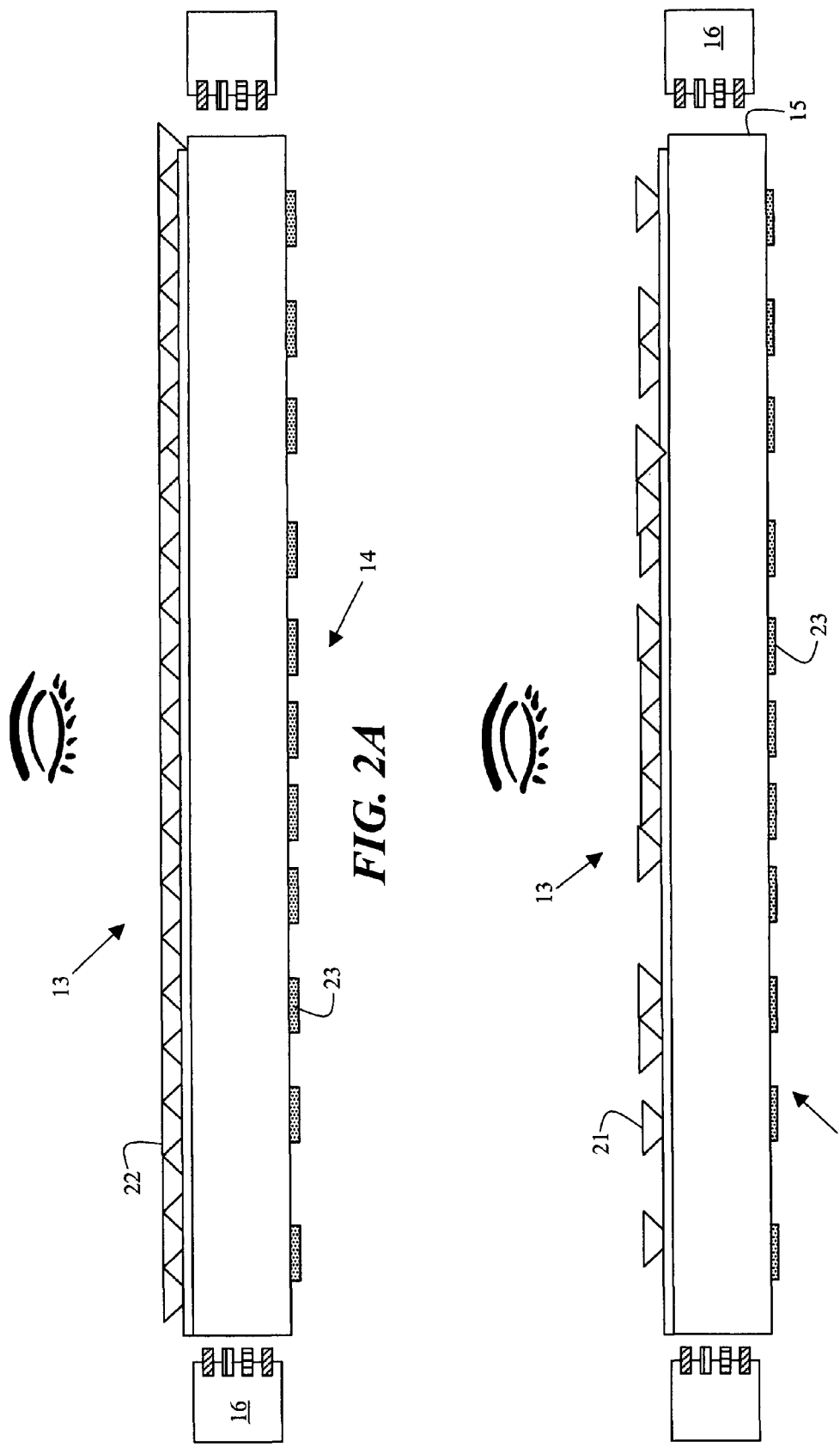

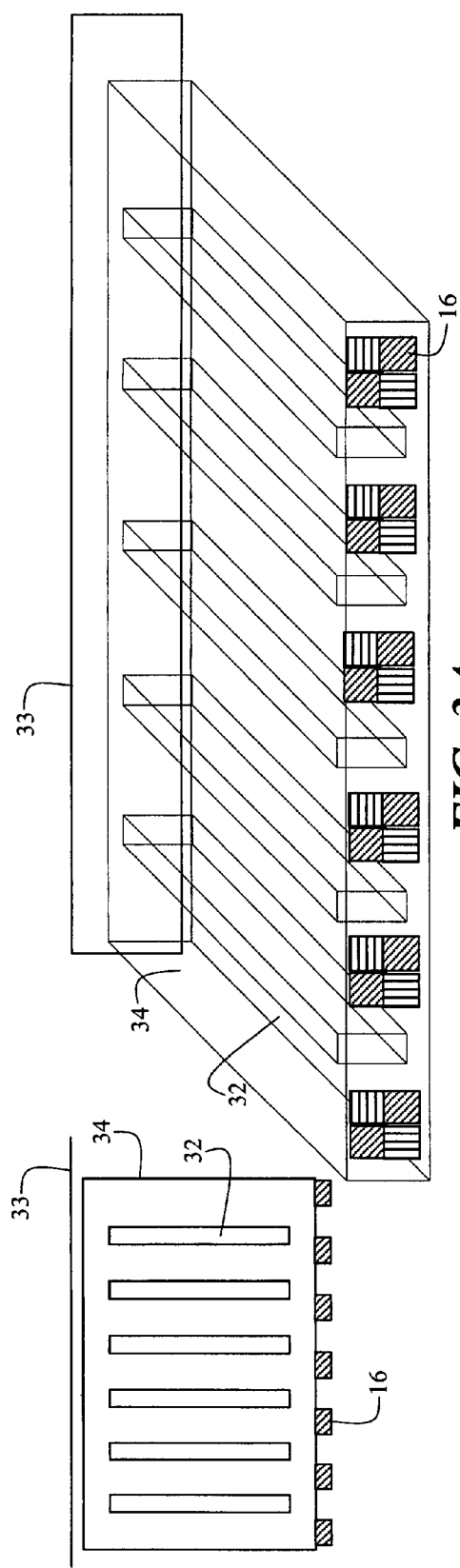
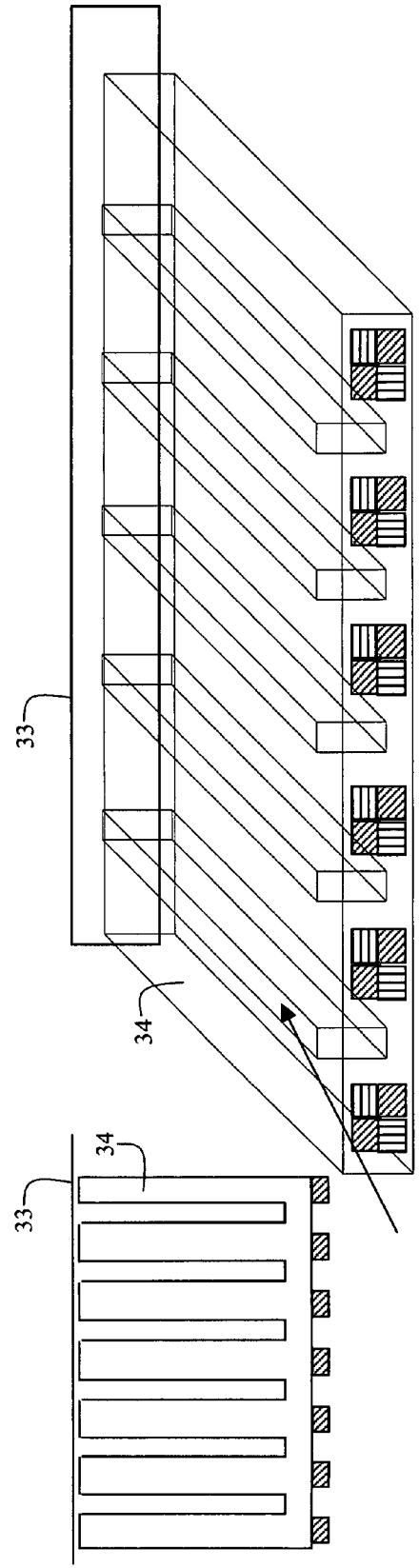
FIG. 3A
FIG. 3B

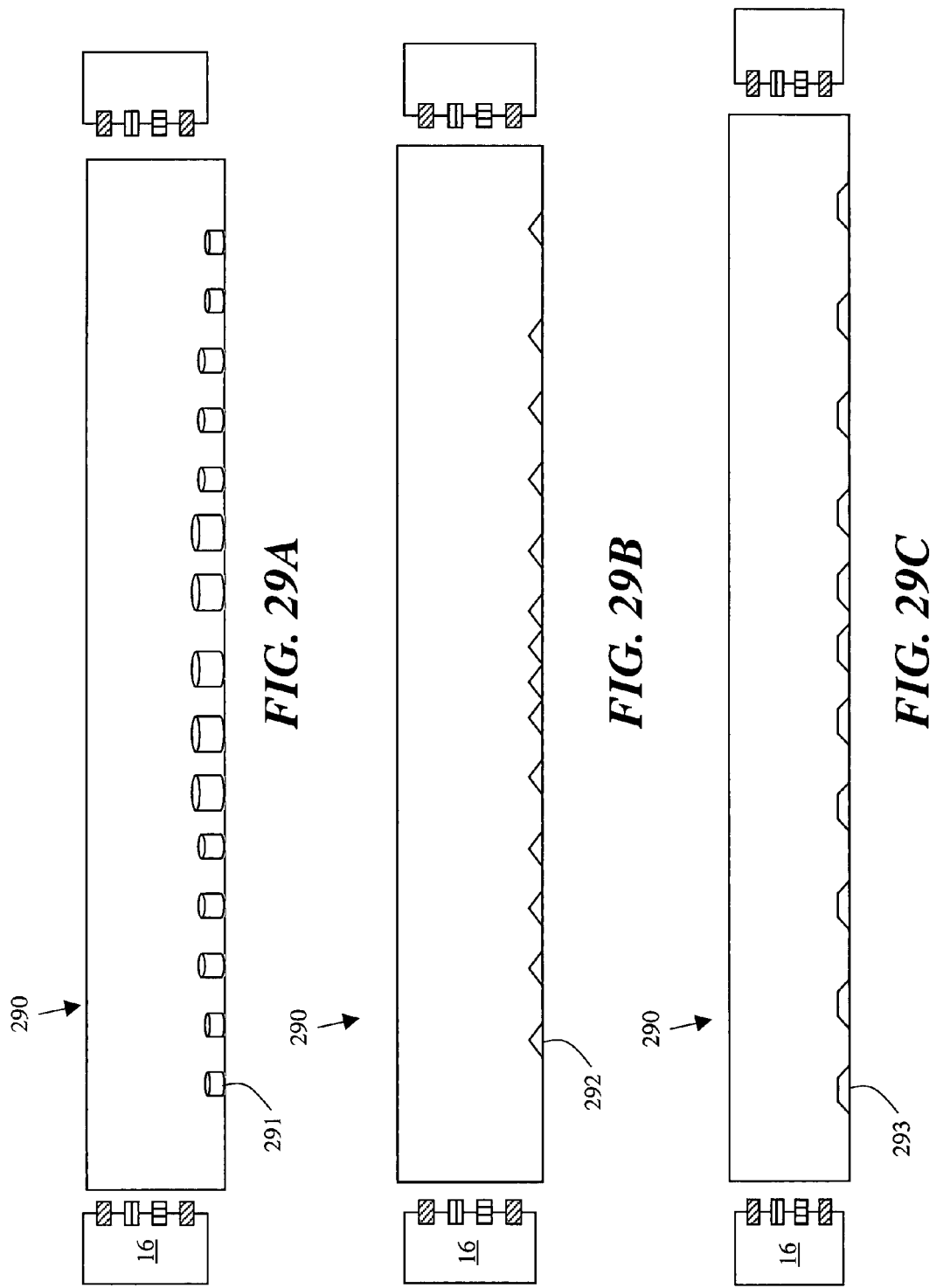

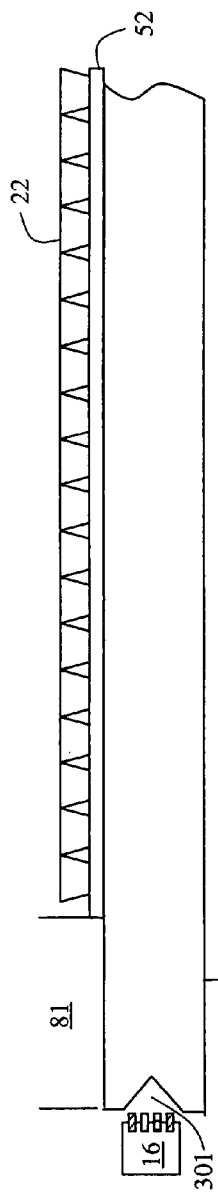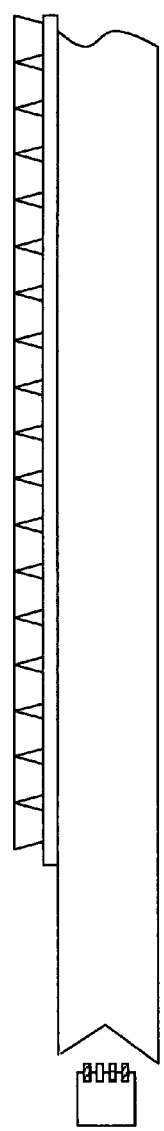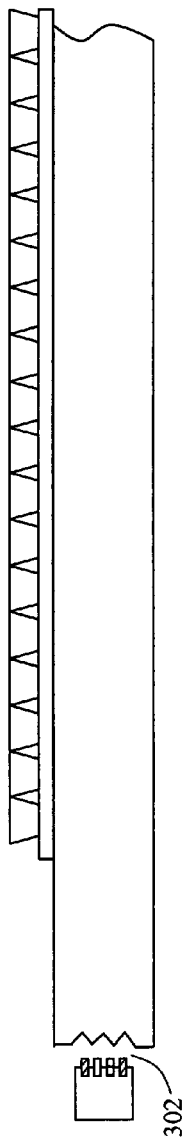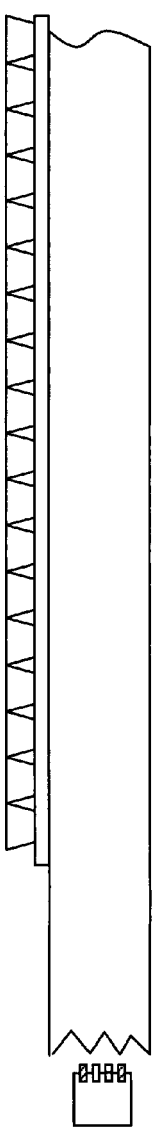
FIG. 30A
FIG. 30B
FIG. 30C
FIG. 30D

ELONGATED ILLUMINATORS CONFIGURATION FOR LCD DISPLAYS

FIELD OF THE INVENTION

This invention relates to the art of backlight apparatus for a display and a liquid crystal display employing such apparatus. In particular, the present invention relates to a Liquid Crystal Display (LCD) backlight with solid-state light sources.

BACKGROUND OF THE INVENTION

While liquid crystal displays (LCDs) offer a compact, lightweight alternative to cathode ray tube (CRT) monitors, there are many applications for which the image quality of LCD displays are not yet satisfactory, particularly as the relative size of these devices increases. Larger LCD panels, such as those used in laptop computer or larger displays, are transmissive, and thus require a backlight. This type of light-providing surface, positioned behind the LCD panel, directs light outwards and towards the LCD.

Conventional approaches for backlighting use various arrangements of cold cathode fluorescent (CCFL) light sources with light guide plates, one or more types of enhancement films, polarization films, reflective surfaces, and other light conditioning elements. Conventional flat panel backlight solutions using side-mounted CCFLs are less and less desirable as display size increases and, particularly as display area grows, can be susceptible to warping in manufacture or due to heat. Light-guiding backlight techniques that are conventionally employed for smaller devices are increasingly hampered by low brightness or luminance levels and by problems related to poor uniformity as the display size increases, such as would be needed for digital TV, for example. Existing backlight apparatus for LCD displays and other display and illumination applications, often using banks of CCFLs lined up in parallel, can be relatively inefficient. These display solutions can also be relatively thick, due to the need to house the CCFL and its supporting films and surfaces behind the LC panel. The CCFL light source itself presents an environmental problem for disposal, since these devices contain some amount of mercury. To compensate for uniformity and brightness problems with conventional CCFL-based backlights, a number of supporting films are conventionally interposed between the backlight and the display, or disposed following the display, such as relatively high-cost reflective polarization films for example. As is well known, the spectral characteristics of CCFLs are relatively poor when compared to other types of light sources.

Faced with the inherent difficulties and limitations to CCFL used in backlighting applications, researchers have been motivated to pursue alternative backlighting approaches. A number of solutions have been proposed utilizing Light-Emitting Diodes (LEDs). Recent advances in LED brightness, color output, and overall performance, with continuing reduction in cost, make LEDs, lasers, and solid-state light sources in general particularly attractive. However, because LEDs and lasers act as point light sources, appropriate solutions are needed for redirecting and spreading this light to provide the uniform plane of light that is needed for backlighting and to provide the necessary color uniformity.

One approach for providing backlight illumination using LEDs is using an array arrangement, such as that described in the paper by M. Zeiler, J. Huttner, L. Plotz, and H. Ott entitled "Late-News Paper: Optimization Parameters for LED Backlighting Solutions" SID 2006 Digest pp. 1524-1527. Using this type of solution, an array of LED clusters using Red (R), Green (G), and Blue (B) LEDs is deployed as a backlight for an LCD displays. Two types of clusters are described: RGGB and RGB. Similarly, U.S. Pat. No. 6,789,921 entitled "Method and Apparatus for Backlighting a Dual Mode Liquid Crystal Display" to Deloy et al. describes an array arrangement used for an instrument panel. However, except for specialized uses such as for some types of instrument panels and for very high-end monitors and TV panels, array arrangements do not appear promising, due to problems of poor color and brightness uniformity, high parts count, high heat, and dimensional requirements.

Light guides have been employed for spreading light from a point source in order to form a line of light. For example, U.S. Pat. No. 5,499,112 entitled "Light Guide, Illuminating Device Having the Light Guide, and Image Reading Device and Information Processing Apparatus Having the Illuminating Device" to Kawai et al. discloses redirecting light from one or more LEDs to a line in a scanning apparatus, using a single light guide having extraction features distributed along its length. U.S. Pat. No. 5,400,224 entitled "Lighting Panel" to DuNah et al. describes a molded panel assembly having multiple light guides that are treated with randomized roughness over a back surface for backlighting illumination.

A number of solutions have been proposed for redistributing LED light over a larger area, along a light guiding panel. One proposed solution is the MicroLens™ molded light guide from Global Lighting Technologies Inc., Brecksville, Ohio that spreads light from a single LED over a larger light panel. Similarly, U.S. Patent Application Publication No. 2003/0123246 entitled "Light Emitting Panel Assemblies" by Parker shows a small-scale light panel using multiple point sources with optical "deformities" that redirect light into the panel.

Another type of solution first directs the light from the LED, lamp, or other point source along a line, then spread this light over a panel. For example, U.S. Pat. No. 5,835,661 entitled "Light Expanding System for Producing a Linear or Planar Light Beam from a Point-Like Light Source" to Tai et al. describes a beam-expanding light pipe that directs a line of light to a light panel for distribution over an area. Similarly, the luminaire arrangement described in U.S. Patent Application No. 2005/0231973 entitled "Efficient Luminaire with Directional Side-Light Extraction" by Cassarly et al. uses a light pipe with a light extraction structure for redirecting light along a backplane, such as for an exhibit or display case. As yet another example of this approach, U.S. Pat. No. 5,857,761 entitled "Illumination Device" to Abe et al. describes a light guide that spreads point source light into a light radiation plate.

Still other backlighting solutions employ flexible optical fibers for directing light from a single light source, then treated for spreading the light for emission behind an LCD panel. Different versions of this approach are described, for example, in U.S. Pat. No. 6,714,185 entitled "Back Lighting Apparatus of Liquid Crystal Display Using Optical Fiber" to Kim et al. and in U.S. Pat. No. 5,542,016 entitled "Optical Fiber Light Emitting Apparatus" to Kaschke.

As the above-cited examples attest, there has been considerable work directed to the goal of providing LED backlighting. However, although there have been a number of solutions proposed, there are significant drawbacks inherent to each type of solution, particularly when faced with the problem of backlighting for a display panel of standard laptop dimensions or larger. The 2-D matrix proposed in the '921 Deloy et al. disclosure would be difficult to implement inexpensively, of relatively high cost, bulky, and prone to uniformity problems. The light guide arrangement described in the '112 Kawai et al. disclosure is optimized for scanning applications that require a uniform line of light, rather than display backlighting applications. The molded panel arrangement described in the '224 DuNah et al. disclosure may work well enough for general illumination, but would be prone to uniformity problems for full-color display applications. This type of solution is increasingly expensive to manufacture in larger sizes and is subject to warping due to heat and mechanical stress. More importantly, such a solution does not provide good color mixing and would not be well suited to applications using solid-state light sources. Point source-to-panel configurations such as those described in the '3246 Parker application are impractical and exhibit uniformity problems for color and brightness for larger-sized displays. Light-guide-to-back-panel arrangements such as those described in the '661 Tai et al. disclosure are inefficient, are subject to poor uniformity, and are suitable only for relatively small displays. The use of treated optical fibers has advantages for small-scale handheld displays but would be impractical and inefficient for desktop or larger display designs.

In addition to these drawbacks, conventional solutions generally fail to address important challenges for high-quality color imaging, required for widespread commercialization and acceptance of LC displays. Color gamut is one important consideration that is of particular interest to display designers. Conventional CCFLs provide a measure of color quality that is acceptable for many applications, offering up to about 70% of the NTSC color gamut. Although this may be acceptable for laptop and computer monitor applications, it falls short of what is needed for full-color TV displays.

In contrast to CCFL light sources, LEDs and other solid-state light sources, because of their relatively high degree of spectral purity, are inherently capable of providing 100% or more of the NTSC color gamut. In order to provide this enlarged color gamut, three or more different-colored LEDs or other solid-state sources are needed. To support such an expanded color gamut when using LEDs and other solid-state light sources, a high level of color mixing is required from the backlighting apparatus. As is well known to those skilled in the imaging display art, achieving a good level of color uniformity when using solid-state light sources, such as Red (R), Green (G), and Blue (B) LEDs, is particularly challenging. Conventional backlighting solutions that employ larger-area light guides, such as those described above, would provide correspondingly inferior color mixing.

Other challenges related to backlighting for larger scale displays include the need for low-cost assembly, light efficiency, uniformity, and compact size. As noted earlier, conventional LED backlighting solutions fall short of what is needed to meet these additional requirements. Additionally, it would be particularly useful to eliminate the need for a reflective polarizer, which may be possible where uniformity and brightness are sufficiently improved.

Thus, it can be seen that there is a need for an LED backlight solution that can be inexpensively manufactured, has minimal thickness, and provides color mixing with good uniformity, high brightness, and high levels of efficiency.

SUMMARY OF THE INVENTION

The present invention provides a solid waveguide comprising opposite TIR surfaces further comprising:
 a) at least one light input surface for coupling light from a solid state light source;
 b) at least one mixing section;
 c) at least one light emitting surface; and
 d) a desired pattern of light redirecting features located on one TIR surface or between the TIR surfaces.

The invention also provides variations in the backlight apparatus and a display employing the backlight apparatus. A process for providing light is also disclosed. It is a feature of the present invention that it provides a backlight that utilizes multiple illumination channels.

It is an advantage of the present invention that it employs solid-state light sources to provide area backlighting for a display. The apparatus of the present invention is scalable and is particularly adaptable to larger sized LC panels.

It is a further advantage of the present invention that it eliminates the need for a light guide plate or other planar type panel, which can help to reduce cost and dimensional profile for backlight components.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

FIG. 2A is a light bar with view side extraction features and non-view surface pattern.

FIG. 2B is a light bar with a variable density surface extraction feature on the view side and a variable density printed dot pattern.

FIG. 3A an integral elongated illuminator formed by removing portions of the material from a lightguide plate FIG. 3B is a lightbar with connecting integral solid pathway

FIG. 30 is a elongated illuminator with film that has indents on one side

FIG. 30A is a elongated illuminator with prism-shaped light input

FIG. 30B is an elongated illuminator with large prism shaped light input

FIG. 30C is a elongated illuminator a multiple wedge light input surface

FIG. 30D is a elongated illuminator with a multiple wedge light input surface that cover the entire end of the elongated illuminator.

DETAILED DESCRIPTION OF THE INVENTION

Figure 1:
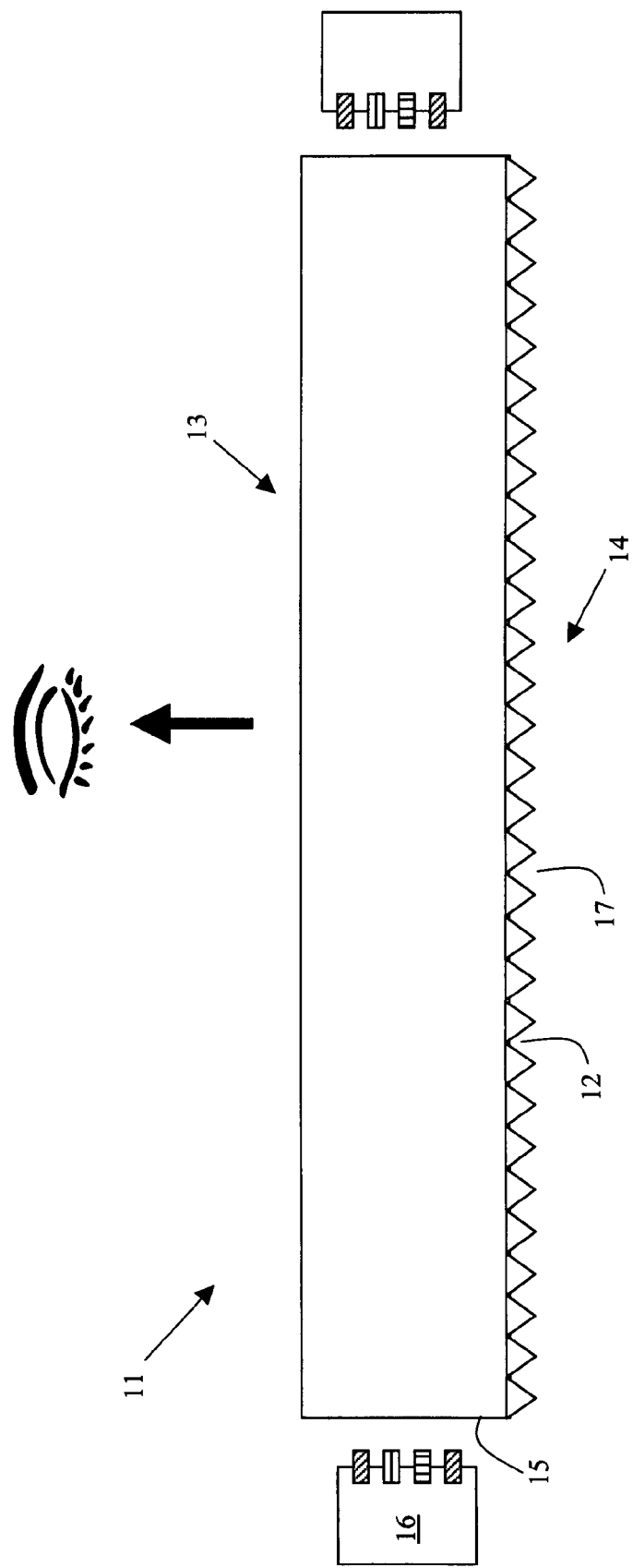
FIG. 1 is a light bar with a bottom (non view side) prism-like structure

The present invention provides a backlight apparatus that is well-suited to display applications, particularly for LC display panels, such as those used for LCD TV, medical diagnostics displays, imaging displays, and military displays, for example. In addition, the backlight apparatus of the present invention can be used for other illumination applications where solid-state lighting is advantageous.

In the context of the present disclosure, the term "solid-state light source" has its conventional meaning accepted by those in the illumination arts, indicating a type of emissive light source formed from semiconductor materials. Solid-state light sources include, for example, Light-Emitting Diodes (LEDs), Organic Light Emitting Diodes (OLEDs) and (Polymer Light Emitting Diodes) PLEDs, as well as semiconductor lasers. Generally the term solid state light source as used herein means any source of light from a small point-like source but the design of the emission source may be such that the light being emitted is either collimated or spread so as to appear to be non-point-like. An array of several solid state light sources may be arranged in a manner or with lens elements so as to combine the light in a broader non-point-like source.

In the context of the present disclosure, light direction is described as upwards. A backlighting apparatus thus emits light upwards from an illumination plane. The terms "below" and "above" then comply with this direction assignment. A display panel is a transmissive spatial light-modulating device, such as an LC display device or other array of light valves. The term linear or elongated as used herein with respect to illuminator and light channels means much longer in length than in width, typically approaching the length of the display in one (length) direction but not nearly that long in the other (width) direction. These terms may be straight or curved such as serpentine. Examples may include a variety of cross-sectional end-shapes such as square, rectilinear, round triangular or they may be a composite shape of two or more shapes. At least one surface of the illuminators or light channels may comprise a means to extract or otherwise breakup or redirect the total internal reflection of the light channel. Such a means may to done in a manner provide uniform light appearance.

The terms as used herein elongated illuminator and light bars are the same. The term Ra is a measure of the peak to valley height difference of a surface. Surface topography is of great importance in specifying the function of a surface.

The roughness of a surface can be measured in different ways which are classified into three basic categories:

Statistical descriptors that give average behavior of the surface height. For example, average roughness Ra; the root mean square roughness Rq; the skewness Sk and the kurtosis K.

Extreme value descriptors that depend on isolated events. Examples are the maximum peak height Rp, the maximum valley height Rv, and the maximum peak to valley height Rmax.

Texture descriptors that describe variations of the surface based on multiple events. An example for this descriptor is the correlation length.

Among these descriptors, the Ra measure is one of the most effective surface roughness measures commonly adopted in general engineering practice. It gives a good general description of the height variations in the surface. There are both mechanical and optical measurements. Typically when very smooth surface finishes are discussed an optical means is used to measure the roughness. When coherent light illuminates a rough surface, the diffracted waves from each point of the surface mutually interfere to form a pattern which appears as a grain pattern of bright and dark regions. The spatial statistical properties of this speckle image can be related to the surface characteristics. The degree of correlation of two speckle patterns produced from the same surface by two different illumination beams can be used as a roughness parameter.

The embodiments of U.S. Ser. No. 11/677,591 are incorporated herein by reference. The solid waveguides with elongated illuminator useful in this invention extend along an illumination plane and redirect light upward, in the direction of a display panel. The display panel and illumination plane are substantially in parallel. The primary direction of light from light channel array is upward and toward display panel. As can be well appreciated by those skilled in the imaging arts, elongated illuminators could be disposed orthogonally so that they extend in the general direction of the x axis and are spaced apart by some distance along the y axis. In subsequent description and figures, extension along the y axis is shown, but the orthogonal arrangement could alternately be used. In some embodiments useful in this invention, the elongated illuminators have a center to center spacing between elongated illuminators of less than 25 mm.

A type of, elongated illuminator light channel has a length dimension L that is well in excess of its width dimension W or thickness dimension T. Preferably, length L is greater than 5 times width dimension W. Preferably, width dimension W and thickness dimension T differ from each other by no more than a factor of 2. In one embodiment dimensions T and W are approximately equal. Maintaining dimensions W and T at much less than length L improves color mixing and uniformity, since light that is directed into elongated light channel 18 is propagated through this light-guiding structure by means of Total Internal Reflection (TIR). Because it uses TIR, elongated illuminator light channel is highly efficient, with very low light loss except in the intended direction as provided by light extraction element. In other embodiments useful in this invention the length of the elongated illuminators to the light input surface area has a ratio of greater than 100/1.

Rigidity of solid elongated illuminator light channels helps to provide more uniform light output, since the distance between illumination plane and display panel is best kept constant. In the context of the present disclosure, the descriptive term "rigidity" applies to an element that exhibits no visible bowing or bending due to its own weight. This arrangement also simplifies assembly of elongated light channels into light channel array. In cross-section, elongated light channel may be square, rectangular, or circular, or have some other shape. For example, solid elongated light channel can have variously curved sidewalls for improved mixing of light from LED light sources. The cross-sectional shape or dimensions may change over the length of elongated light channel, so that elongated light channel is tapered, as shown in subsequent examples, or otherwise changes its cross-sectional shape. Useful embodiments may have more than one slope associated with the taper or in may be a radius with constantly changing slopes. In such embodiment it may also be useful to have a mixing section that starts at the light input surface and continue for a short distance. While long distance are useful, it has been found that a light mix section of between 20 and 60 millimeters is sufficient to provide good color mixing. The tapers as described herein are useful in providing uniform brightness along the length of the solid waveguides of this invention. It is desirable to provide waveguides that provide on-axis brightness of greater than 2000 cd/m$^2$.

As noted earlier, achieving a high level of color uniformity when using RGB LEDs can be a significant challenge. A single LED might alternately be used, such as a white light LED. Alternately, additional color LEDs can be used to increase brightness or enhance color gamut, such as to provide an RGGB arrangement or to add cyan, orange, or other colors. Other lighting arrangements are also possible, as is described in more detail subsequently. In some embodiments having more than one solid state light source per light input surface may be useful. For long lengths of elongated illuminators, having more than one light source per light input surface provides more light without having to run at high levels of power and risk potential burn out of the solid state light source. Having more than one light source also helps to assure that there is sufficient light to reach the far regions of the solid waveguide while maintaining sufficient brightness.

There are a variety of film with different functionality that may be used with the solid waveguides of this invention. These include but are not limited to a diffuser that could be a bulk type diffuser that employs pigments, air voids, or internal glass beads. Alternately, the diffuser could be a surface type diffuser, for example, a beaded surface with mono or multi-sized beads with a transparent binder. A Fresnel lens type diffuser could also be used. The solid waveguide use in a display that is useful in this invention may further comprises at least one function selected from the group consisting of light diffusing, light collimation, brightness enhancement, light polarization, light modulating, light filtering, a light source. Such functions are useful in providing higher brightness, good on-axis as well as off-axis viewing. Light collimation, diffusion and scattering helps to manipulate light to provide the most pleasing viewing to the viewer.

Light management films discussed above may include but are not limited to various types of light enhancement films or Brightness Enhancement Films BEF), such as Vikuiti™ Thin Brightness Enhancement Film, a product of 3M, St. Paul, Minn. Polarizers can also be provided, such as reflective polarizers. The films and their functions may be combined into a single film with more than one functionality.

Elongated illuminators may be distributed in any of a number of configurations. The separation distance between adjacent elongated illuminators can be varied based on factors such as the needed brightness, area, and uniformity. Adjacent elongated illuminators can be adjacent, but not optically coupled. An integral bridge may join one or more elongated illuminators in part of the profile as shown in some of the figures in this invention. Such integral bridges are useful for providing improved stiffness and may also help to provide improved brightness uniformity between elongated illuminators.

Fill factor can be an important consideration for achieving needed brightness levels, as well as for mixing spectral components where light sources of different wavelengths are used. Fill factor for each elongated illuminator would be computed as the ratio of the surface area of the one or more light sources that direct light into light channel to the incident light surface area of light channel. Fill factor for backlight apparatus would be computed as the ratio of the sum of the emissive areas of elongated illuminators to the surface area of illumination plane of the apparatus.

Light Sources

Each elongated illuminator has at least one independent solid-state light source 16. Solid state light source can be independent in that it delivers light.

Solid-state light sources 16 could be LEDs, as noted earlier. LEDs are advantaged due to their high brightness and good spectral characteristics. Providing direct light emission within narrow wavelength bands, LEDs are thus capable of providing illumination that offers an improved color gamut over conventional light sources. CCFL sources, for example, offer about 70% of the NTSC color gamut when used with an LCD panel. LED sources can achieve 100% or greater of the NTSC range. LEDs also are advantaged because they can be rapidly pulsed.

Elongated illuminators and in particular solid waveguides with a mixing section of the present invention provide a high degree of color mixing for LEDs. Unlike light guiding plates and other conventional solutions, the solid waveguide with elongated illuminators and mixing sections that form a light channel with relatively narrow width dimensions provide excellent color mixing. This arrangement yields a substantial number of reflections as light propagates through the mixing section and down the path provided by the elongated illuminators light channel. TIR activity. Red (R), Green (G), and Blue (B) LEDs can be positioned as an RGB triad of LEDs at one or both ends of light channel 18. An RGGB arrangement, with more than one LED of one or more colors could alternately be used to boost the green light level. Alternately, R, G, and B LEDs could be distributed at different ends of light channel, so that, for example, a single light channel has a Red and a Green LED on one end and a Green and a Blue LED on the other end. Optionally, a fourth LED, such as a white light LED, or other color LED, could be positioned at one or both ends of light channel. In another embodiment, each separate light channel could have a single color light source, so that, for example, three adjacent light channels have Red, Green, and Blue LEDs respectively.

Dichroic filters could be used to direct light into individual elongated light channels Light sources can be continuously on, so that mixed RGB or white light is provided to display plane. Alternately, color sequential backlighting arrangements are possible. In one embodiment, R, G, and B are rapidly cycled from backlight apparatus by activating the corresponding light sources 16 in sequence. Alternately, a linear scan can be provided, with R, G, and B or other colors provided in a scrolling sequence across the surface of backlight apparatus. A display plane can then activate corresponding rows or columns of pixels with the same sequence, providing sequential modulated color. Such an arrangement would obviate the need for a color filter array, for example, with an LC display. Mixed colors such as cyan, magenta, and yellow could alternately be provided using timed activation of the light sources.

Laser light sources could alternately be used with elongated illuminator of the present invention. Their relative spectral purity and fast response times make lasers an attractive alternative for some types of display applications. The high brightness and high optical power levels of lasers may allow a single source to illuminate multiple elongated illuminators light channels.

Alternative light sources that are can be used with elongated illuminator may include Organic Light Emitting Diodes (OLEDs) and (Polymer Light Emitting Diodes) PLEDs.

Light Channels

Elongated illuminators light channels are formed from highly transparent materials, including various types of glass, such as a laminated safety glass. Plastics that can be used include PMMA, polycarbonate, polyester, polyamide, polysulfone, polyolefin, cyclic-olefin and copolymers thereof. Light channels may have additives for improved thermal and light stability. Optical transmission of the material should exceed about 90%. Except where intentionally treated, surfaces of light channel should have an optical finish. A high index of refraction n is preferred for its favorable light-guiding properties.

In fabrication, elongated illuminators light channels could be cast, profile extruded or molded. Further conditioning of the material, such as by heating and polishing, could be beneficial for achieving improved optical performance. It is also useful to provide solid waveguide and elongated illuminators with a high degree of smoothness. Having a TIR surface with less than 50 nm Ra of roughness helps to minimize light leakage due to scattering when light hits a rough surface. Rough surfaces will breakup the TIR of the light and change its angle such that it may exit the elongated illuminator in an undesired point. This can reduce the overall effectiveness of the elongated illuminators.

A high degree of stiffness or rigidity is advantageous for providing light channel as a modular component for a larger backplane apparatus. High stiffness allows for simple handling and ease of assembly of light pipe array. A stiffness in excess of 10 mN is preferred. A clip, holder, or other support can be used to help prevent sagging or bowing for light channels of longer length. Light channels should have a width W dimension that is sufficient to constrain bending. Additional support structures, if needed, can be used to prevent sideways bending.

Elongated illuminators light channel may be separated from light source by some distance in the embodiments shown in the present application. However, it is also possible to embed light source within elongated light channel.

Light Extraction Features

There are a number of embodiments for light extraction element and or light redirecting features as shown in the figures in this disclosure. The basic function of light redirecting features of elongated illuminator is to direct light that is otherwise being channeled by TIR and thereby cause light to be turned and then emitted from view side of the elongated light channel. This can be done in a number of ways, including the following:

(i) Treatment of light channel to form an emissive surface. Types of surface treatment include forming light redirecting structures along an edge of elongated light channel, along the surface that faces the display. For example, one approach is to form an array of prism structures along the length direction L. Microstructures used could be an array of prisms, pyramids, hemispheres, or other well-defined geometries to frustrate TIR. These are primarily bottom or in some embodiment side structures formed as individual elements, or aligned in columns. Microstructures could be molded or otherwise formed of varying shapes and sizes, as a function of the distance from the light source. Additionally light extraction features may be used in the embodiments of this invention. Light extracting features typically are located on the view side of the elongated illuminators. One example of this approach is given in U.S. Pat. No. 5,506,929 to Tai et al., cited earlier. The surface of elongated light channel 18 could also be roughened or polished to provide light extraction element 20. Embossing or pressure can be used to form light extraction features.

(ii) Application of a light-extracting film component. One possible film for this purpose is described in commonly assigned U.S. Patent Application No. 20050270798 entitled "Brightness Enhancement Film Using A Linear Arrangement Of Light Concentrators" by Lee et al., incorporated herein by reference. Strips of a light extracting film can be applied to the surface of elongated light channel 18, using adhesive, for example. Adhesives used can be pressure or heat-sensitive and could be curable using ultraviolet or electron-beam radiation. Chemical cross-linking materials such as epoxies could alternately be used. Adhesives capable of withstanding a broad temperature range (−40 to 85 C) are often required for LCD display applications. Adhesive that can withstand higher temperature range (60-85 degrees C.) and higher relative humidity (95% @ 65° C.) would be preferred. A high degree of optical transmission would be preferred. Additives could be used to modify the refractive index of adhesives. A fine-tip dispenser or hot melt glue dispenser could be used to attach segments of a film component to a sidewall (Light-emitting side directed towards the display panel or view. of light channel 18. In fabrication, light channels 18 could be placed side by side, then have a film attached to one surface, then be trimmed and separated, or packaged and used with the affixed film. Any adhesively attached material should be carefully selected so that it does not provide bending force under high heat conditions.

Optionally, the light emissive surface of elongated illuminator may be featured to form light extraction structures thereon. A portion of light channel can be molded such as using a roller or otherwise treated to form light-redirecting microstructures. If elongated illuminator is injected molded, surface light extraction structures (their negative form) may be formed as part of the mold. Then, as the polymer is injected and cooled, the light extraction structures become an integral part of elongated illuminator.

(ii) Printed dots. A pattern of reflective dots, printed along a base portion of light channel opposite its light emission surface, can be used to redirect light outward from light channel. Printed dots can be of varying density and size, helping to provide a more uniform light output. Examples of light extraction techniques using this type of approach include that described in U.S. Pat. No. 5,857,761 to Abe et al., cited earlier.

(iii) Shaping of elongated light channel. Light channel could be formed with a tapered profile. In one embodiment, light channel is tapered and extends the full width of display plane. (iv) Volume-scattering. As another option, micron-scale particles can be dispersed inside light channel 18 to create scattering due to a refractive index mismatch.

(v) Internal mirrors. As described in U.S. Pat. No. 6,104,371 entitled "Modular, High-Intensity Fiber Optic Backlight for Color Displays" to Wang et al., TIR can be interrupted by reflective structures that are formed within a light guide.

Combinations of these types of treatments listed in (i) through (v) above could also be used. Light extraction features could be individual elements. In order to provide uniform light emission along the length of light channel, the size and density of the coupled area may vary as a function of the distance along light channel from solid-state light source. For example, where there are LED light sources at each end of light channel, light extraction features could be distributed with higher density near the center than toward the ends. Alternately, the distribution density of light redirecting elements could be substantially continuous in one direction.

Light redirecting may be provided on more than one surface. The opposite side of light channel, furthest from the LCD and output surface, generally provides a smooth surface to prevent light leakage but may alternately be structured, treated, or roughened to enhance the amount of light extraction.

Light redirecting elements may be molded into, embossed, pressed, adhered, printed or laminated to the of elongated illuminator light channel that faces display panel 24 or other light output side.

Monitoring Color Shifts

One well-known problem with LEDs and other types of solid-state light sources relates to spectral stability and accuracy, which can cause some amount of color shifting. an optional color sensor can be provided as a component of one or more elongated illuminators. Color sensor can be used in a control loop that compensates for color shifts such as can be due to ageing, heat, or manufacturing differences between LEDs or other types of light source. Optionally, image data for pixels nearest a particular light pipe can be adjusted to compensate for detected color shifts.

System Considerations

Using any of a number of devices currently available, elongated illuminator of the present invention is capable of providing a high level of illumination, at between 2000-6000 nits or higher. At high energy levels, heat buildup can be a problem with LEDs in some applications. Backlight apparatus can provide one or more heat sinks, cooling fans, or other mechanisms to help dissipate excess heat during operation. Advantageously, heat-dissipating components can be positioned along peripheral edges of a display device, away from the LCD panel when using the apparatus and methods of the present invention.

Useful embodiments in this invention include a solid waveguide comprising opposite TIR surfaces further comprising:

at least one light input surface for coupling light from a solid state light source;

at least one mixing section;

at least one light emitting surface; and a desired pattern of light redirecting features located on one or between the TIR surfaces.

Such an embodiment with a mixing section provides very uniform light mixing, helps to maximize the amount of light that is coupled into the waveguide and in particular those with elongated illuminators. The light redirection features help to redirect light in a controlled manner so as to provide uniform brightness along the length of the elongated illuminators. Other embodiments provide an array of elongated illuminator arranged in a manner to provide uniform light across the entire illumination plane of the solid waveguide. Furthermore the waveguides have at least two opposite TIR surface and the most useful embodiments have at least two other TIR surface. Typically many of the elongated illuminators have a substantially square to rectangular profile that allows light to TIR in a 3-dimensional plane. It should be noted that other embodiments may have round or somewhat elliptical cross-sectional profiles. In this embodiment the would be a continuous TIR profile but at any point there is an opposite TIR surface that would help to propagate light along the length of the illuminator. Such profiles are useful because they do not have shape corners that can breakup the TIR of light in a uncontrolled manner.

In other embodiments useful in this invention there is a light mixing section that is an integral part of the elongated illuminators. Typically the mixing section starts at the light input surface and may extend all or a part of the illuminator length. In the most preferred embodiment the light mixing sections may extend only a few millimeters and the balance of the elongated illuminator may be changed in its profile as shown by the various figures within this disclosure. Within the mixing section the primary function is to mix light from several sources of different color temperatures, so it is desirable to have the mixing section to be substantially free of light directing features. This helps to assure that a true white that has all wavelengths mixed in a manner to provide a uniform color temperature to the solid waveguide and elongated illuminators.

The light output from LED's tend to be strongly hemispherical that projects light in wide range of angles. Useful embodiments in this invention may have a variety of shapes for the light input surface. The light input surface may comprises at least one shape selected from the group consisting of flat, tapered, convex, concave, indented, multi-surfaced, partly reflecting, TIR adjusting. Such shapes are useful in capturing as much light as possible and directing it into the waveguide and illuminators so as to provide a high level of brightness. In addition the design of the light input surface and in some cases the area surrounding the light source and the light input surface may have indents further comprises a means of adjusting the light to a critical TIR angle within said solid light guide. In addition the means of adjusting the light to a critical TIR angle further comprises at least one selected from the group consisting of a reflector, a scatter, a prism.

The solid waveguide and elongated illuminators of this invention may have a desired pattern of light redirecting features that comprises at least one selected from the group consisting of prisms, dots, reflectors, changing slope.

Other solid waveguide with elongated illuminators of this invention may have tapered illuminators that change in slope from the mixing section to the center or opposite end of the elongated illuminators.

The changing slope may comprise at least one taper starting at the light guide side of said at least one mixing section.

In other embodiments the taper terminates at least in one of the group selected from the group consisting of the center, the opposite side said at least one light emitting section, the opposite end of said light guide, a reflector.

In other useful embodiments the solid waveguide with a taper comprises a radius. By changing the slope in a shallow and continuous manner, the light provided along the length of the elongated is redirected in a very uniform manner. It also helps to assure the good brightness.

In other embodiments useful in this the solid waveguide may have tapers with at least two different slopes. Such embodiments help to provide uniform light propagation of light. The taper may further be designed and coordinated with the design of the light redirection features to provide uniform light illumination and good viewing of the display.

Solid waveguide of this invention may further comprises a bridge connecting at least two said at least at least one elongated illuminators. The bridge is useful in holding the elongated illuminators in a fixed position in relation to each other as well as to provide added strength to minimize sagging of the elongated illuminators. The bridge may be applied to the elongated illuminators or it may be formed as an integral part of the waveguide. When the bride is on the viewing side of the display, the bridge may be a thin flat surface that is useful in holding other films at a fixed distance from the illuminators. In some embodiments the bridge may be used to bond other films to it. The flat surface may also be further textured or featured to add additional functionality to the waveguide and display.

In other embodiments of the solid waveguide useful in this invention there is at least one region with air. Such waveguides may be formed directing in a mold or machined to obtained the desired shape.

The solid waveguide of this invention may further comprise at least one elongated illuminator has an end cross sectional profile selected from the group consisting of square, rectangular, triangular, round.

In other embodiments the solid waveguide of this invention may further comprise at least one elongated illuminator that further comprises a region to spread light sideways towards said at least one light emitting surface. Such embodiments are useful in providing uniform light between elongated illuminators.

The solid waveguide of this invention may have at least one light emitting surface is a view side. Having two or more view surfaces any be useful in general lighting applications.

The solid waveguide this invention may also further comprise a region between the elongated illuminators that comprise a means of redirecting light substantially towards said light emitting surface. Such embodiments are shown in the figures of this invention. The region between may be roughened, curved or structured to help provide uniform illumination between the elongated illuminators. To better achieve this it may be desirable to provide solid waveguide wherein the elongated illuminator comprises a means for side light emitting.

In other embodiment the solid waveguide of this invention may have an optical fiber as the elongated illuminators wherein said at least one elongated illuminator an optical fiber. Such fiber may further comprise regions of controlled light leakage. Such controlled leakage is useful in providing higher brightness along the length of the illuminator and has a means to extract it the desired location to help provide uniform lighting.

In other embodiment it may be desirable to provide elongated illuminator that further provides a TIR cladding. The TIT cladding is a material with a different refractive index than that of the core. Such cladding are useful in propagating light long distances with the elongated illuminators.

In another embodiment of this invention a solid comprises at least one light mixing section substantially outside of the view area of a light guide. In this embodiment light from a solid state light source can be mixed to provide uniform color temperature white light in a solid waveguide. By providing the external light mixing section, a traditional light guide plate can provide well mixed and uniform color temperature white light.

The solid waveguide of this invention may also be part of a display. The display may further comprises at least one function selected from the group consisting of light diffusing, light collimation, brightness enhancement, light polarization, light modulating, light filtering, a light source.

The embodiments of this invention further comprise a light source and in particular a solid state light source. The waveguides useful in this invention may be made from a variety of materials such as polycarbonate, polysulfone, UV cured monomers as well as PMMA. PMMA is preferred because it has a high level of transmission and may be processed in a variety of means to form a solid waveguide as well as elongated illuminators. Additional the PMMA has a high level of stiffness and may be optically polished or formed directly to minimize scattering within the elongated illuminators and thereby maximize the transmission of light along it length as well as when light is redirected towards the light emitting side. The solid waveguide of this invention may have a surface roughness (Ra) of less than 25 nm. In some embodiments in which it is desirable to provide controlled leakage at desired point of the elongated illuminators, the surface may be provided with a roughness greater than 25 nm. This roughness may also be provided in a pattern to redirect light to a specific location for a special effect. The surface Ra may be obtained by flame polishing, a combination of liquid grit known as optical polishing compounds or by casting or extruding it against a very smooth surface. (combination of the above may be used). Another means to obtain a desired smoothness may be to flood coat the surface with a polymer allowing it to flow and film and surface not uniformities. It such a case it may be desirable to match the refractive index of the polymer and the PMMA.

The solid waveguides of this invention may designed to provide a brightness uniformity of less than 10% along it length. This in part can be achieved by controlling the design of the light redirecting features in terms of their height, density, size, location, included angle or roughness. The basic design of the elongated illuminator may also be changed in their cross sectional profile as well as providing excellent of light coupling into the light input surface of the solid waveguide and elongated illuminators. The objective is to provide the highest level of light entering the elongated illuminators as possible. Some of the design that would aid in this are shown in the figures of this invention. It should also be noted that the surface input side may further be coated with an anti-reflective coating or surface so as to minimize surface reflective that could have a loss of 4% of the light. It is desirable to capture 100% of the light output from the solid sate light source. Another means may be to optically couple the light source directly by embedding the light output side in a material other than air. Such materials may include but are not limited to high temperature silicone based adhesive, UV cured monomers and oligimers as well as a solvent version of PMMA. With LED's heat is a concern so other embodiments of this invention may further comprise a heat sink with the light source such as metal fins, cooling air directly applied to the light source from a fan or exhaust to help keep the temperature from building up. Although not shown in the figures, the LED couple be position under the solid waveguide and separated by a false bottom reflective pan. The light couple be couple by a series of mirrors or other waveguide means know in the art.

The solid waveguide of with elongated illuminator may have a length to said at least one input surface area ratio of greater than 100/1. Such a shape helps to provide good TIRing of light and minimizing light loss.

The solid waveguide of this invention may have a color mixing section that is between 20 to 60 mm in length and substantially adjacent to the light input entry or entries of the elongated illuminators. This is desirable to help achieve a uniform color temperature of light. This coupled with the design, light redirecting features are all useful in providing a solid waveguide of this invention that provides on-axis brightness of greater than 2000 cd/m$^2$. Furthermore it is desirable to provide light from a solid state light source that is redirected substantially normal to said at least one light emitting surface. In such a manner other films can be used to direct light to provide a high level on on-axis brightness as well as to provide excellent off-axis brightness. The desire is a brightness uniformity along the length of the elongated illuminators and of the display form by said of less than 10%.

Embodiment 1

FIG. 1 is a side view of a elongated illuminator 11 with bottom prism-like structure on the non-view side, a view side 13 and a non-view side 14 (side opposite the view side). The light bar also has at least one light input ends 15 and at least one solid state light source 16. The prism-like structure 12 may have an included angled features of either constant angle of variable angle to control the amount and relative direction of light. Furthermore the prism-like structure may vary in feature density (shape, size and angle) as a function of the distance from light entering side. While depicted as having two light input side, it may have only one with a optional reflector on the opposite side. It should be noted that other embodiments of this invention may further comprise other light control elements on either the non-view side 14 as well as the view side 13. The functional aspects may include but are not limited to reflection both diffuse and specular, light shaping including collimation, spreading, directional change, and polarization (absorptive, reflective, circular, elliptical and other means), light extraction, optical coupling, light modulating and light filtering. These and other functions may be integrated into the elongated illuminator, attached or non-attached in any order or combination(s). The light input end may further comprise an antireflection function. The elongated illuminator may also have a its sides, and ends finished or polished to a point as to minimize any light extraction that is not intended. The light bar and the prism-like features may also be changed in their shape and dimensions and density to provide color mixing and uniformity of illumination.

Embodiment 2

FIG. 2 is a further variation of the previous figure. FIG. 2A is a elongated illuminator with a view side 13 and a non-view side 14. There is a view side surface extraction feature 22 that is continuous in its pitch between extraction features and on the non-view side is a surface pattern (for example dots or other shape) that varies in their size and or density (relative dot area vs. non-dot area). The dot pattern may be printed or otherwise deposited or formed on the surface. The non-view side may vary in its relative size, density and reflectivity as a function from solid state light source 16. In order to provide uniform light extraction, the density of the non-view side dots increases towards the center of the elongated illuminator. While this and other embodiments are described as having a view side, it should be noted that in many display applications, this side of the light bar may not be viewed directly as there may be one or more intervening layers, films, other features or objects that does not allow the direct viewing of the light bar. The view side is the side that the light is primarily directed towards the viewer or is otherwise primarily illuminated.

FIG. 2B is also a elongated illuminator with a variable density surface extraction feature 21 on the view side 13 and a variable density printed dot pattern 23 on the side opposite of the view side. It should be noted that printed dot pattern may vary in density, size, shape and reflectance. Typically the density of either the extractors or printed dots will be lower near the light input end 15 vs. the center that will have a higher density. The pattern of the dots and or the extractors is adjusted to provide uniform light mixing and illumination. The density will increase along the length of the elongated illuminator the further the light travels from lightsource 16.

Embodiment 3A and 3B

FIG. 3A is another embodiment of this invention in which an integral elongated illuminator pattern is formed by removing portions of the material from a lightguide plate. The integral elongated illuminator could also be molded. The interconnected pattern provides additional stiffness to the elongated illuminators as well as an additional pathway for light move between elongated illuminator-like segments. Both a top view and perspective view for embodiment shown in 3A. There are solid state light source 16 and an air gap 32 that forms a region of low refractive index that aids in the TIR (total internal reflection) of light from the light source within solid elongated illuminator section 34. This elongated illuminator may also have a reflector on the opposite end of the light source in those embodiments in which the light source is provided from one end. Such an arrangement provides for the returns of light into the elongated illuminator for extraction towards the view side. Although not depicted, these and other similar embodiments may have a view side extraction features and or non view side reflective features for example prism-like features, printed dot, reflective surface. FIG. 3B is another variation of a lightbar with connecting integral solid pathway 34.

Embodiment 3C and 3D

Figure 3D:
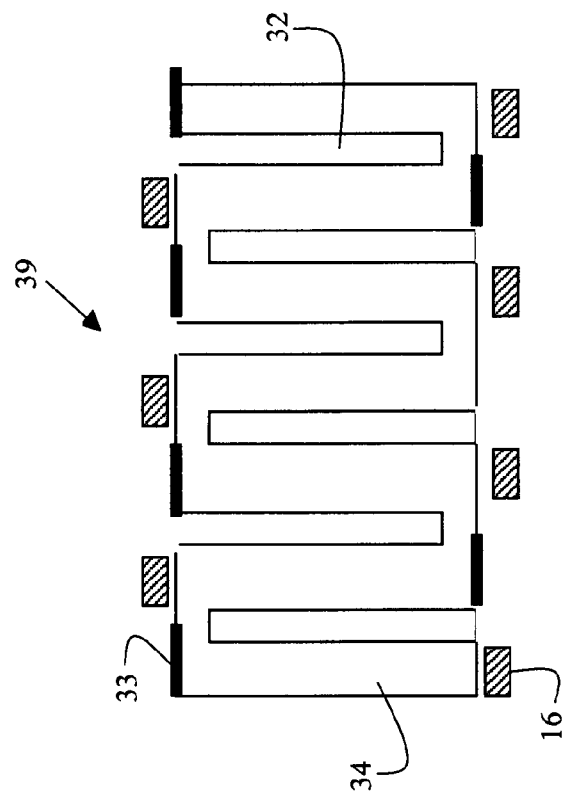
FIG. 3D is a serpentine like elongated illuminator
Figure 3C:
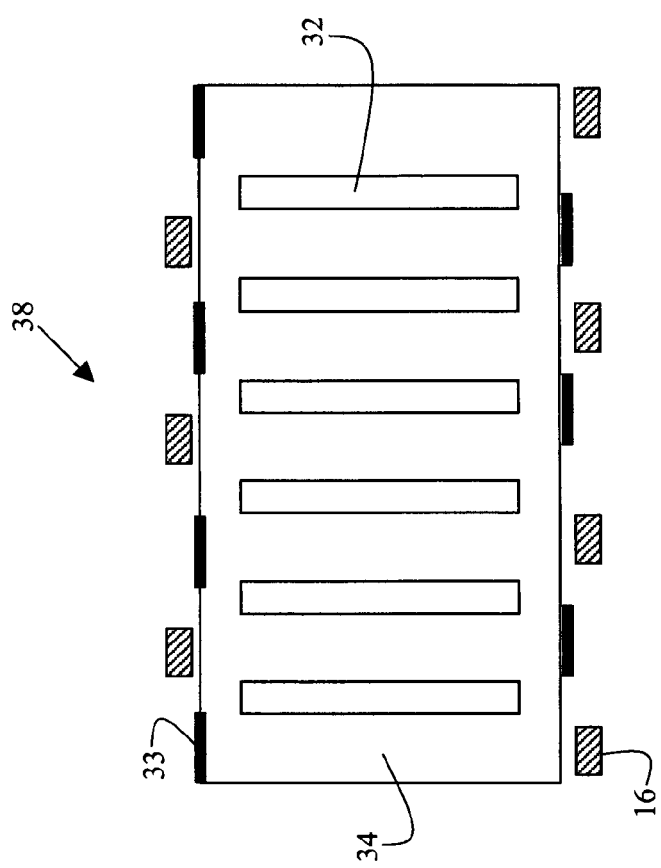
FIG. 3C is a light bar with a light source and optional reflector.

FIG. 3C is a top view of a similar light bar to FIG. 3A except that light source 16 and optional reflectors 33 are applied on staggered and opposite ends of the continuous light bar 38. Internal air gap segments 32 helps to provide TIR of the entering light. Although not shown there is a view and non-view side and as described in other figures and embodiments that may comprise features for light extraction and light redirection.

FIG. 3D is a serpentine like elongated illuminator 39 with solid connecting material 34 and an open air gap 32 to aid in total internal reflection of light from light source 16. Opposing each light source is a reflector.

Embodiment 3E and 3F

Figure 3F:
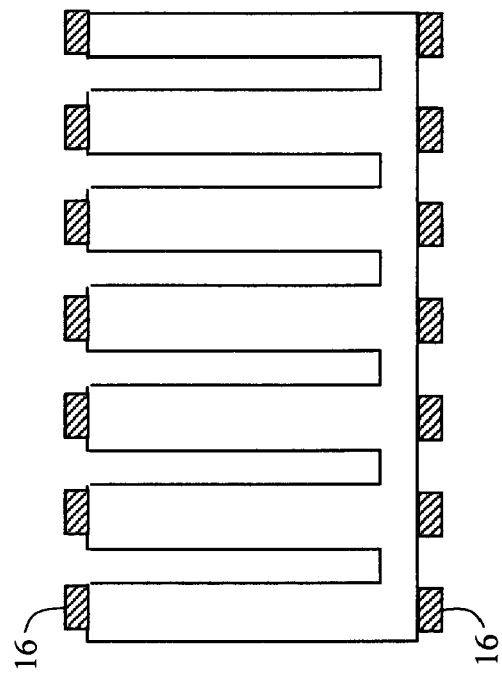
FIG. 3F is an elongated illuminator with open ended air gaps
Figure 3E:
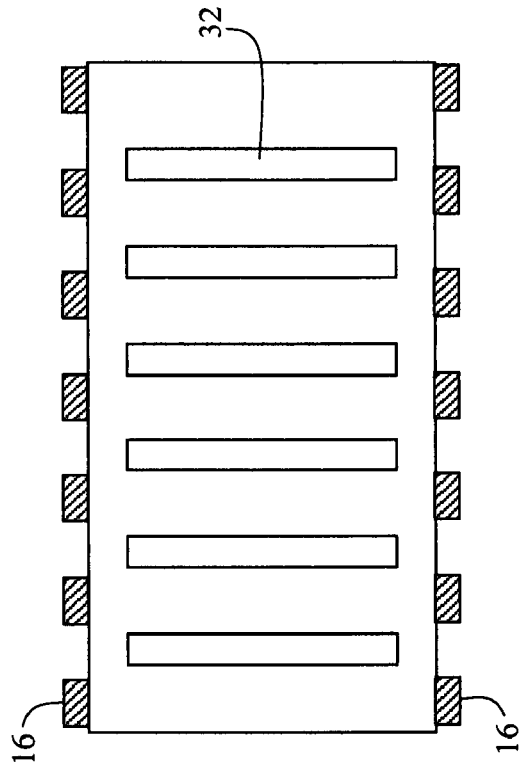
FIG. 3E is an elongated illuminator with internal air gap segments

FIG. 3E is a elongated illuminator with internal air gap segments 32 and light sources 16 on both ends. Having light sources on both ends provide a backlight with increased luminance that can be operated at a lower temperature.

FIG. 3F is another light arrangement with open ended air gaps 32 and light sources 16 on both ends.

Embodiment 4

Figure 4:
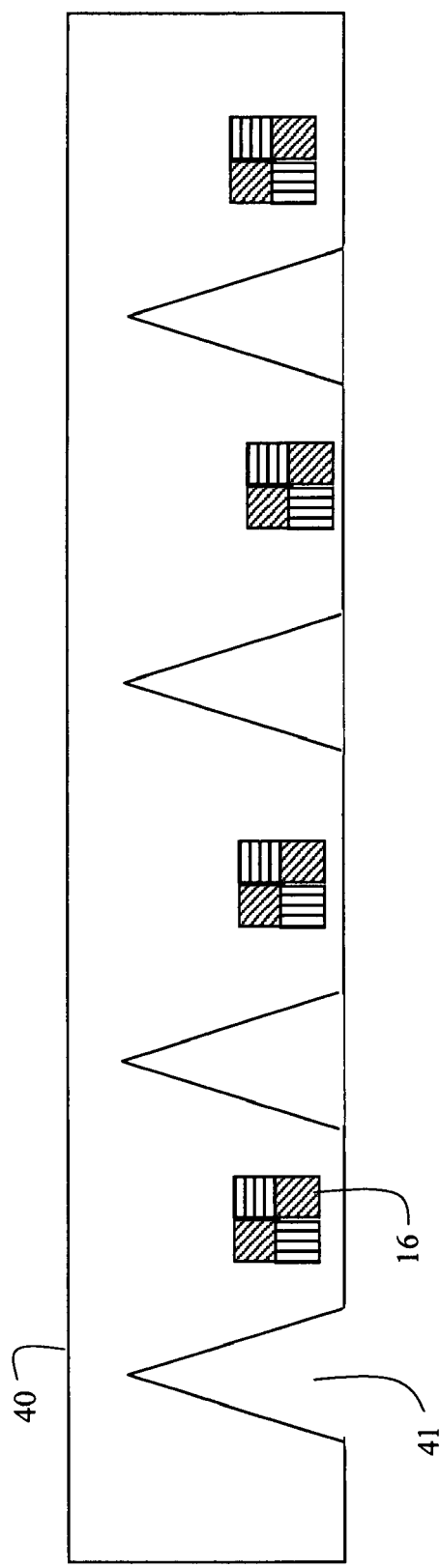
FIG. 4 is a light bar with a tapered air gap

FIG. 4 is an end view of a light bar 40 with a tapered air gap 41. The tapered airgap provides a means for the spreading of light as it moves towards the view side of the apparatus.

Embodiment 5A

FIG. 5 is an embodiment of this invention in which a elongated illuminator pattern is formed from a slab of polymer such as PMMA or polycarbonate. The primary difference in this embodiment is the integral bridge 53 connecting open spaces air gap 32. This embodiment provides a continuous solid surface. While depicted as having the solid surface on top or on the view side, another embodiment could be on the bottom side or on both the top and bottom. Surface extraction features can be placed on the view side and or reflective pattern on the opposite side. Surface extraction features 22 shown in this figure is a continuous channeled extractor that has been adhered to the elongated illuminator with adhesive layer 52. It should be noted that a surface extraction feature that are individual features with varying size, shape and density may also be used to improve the uniformity of light mixing and illumination.

Embodiment 5B

Figure 5A:
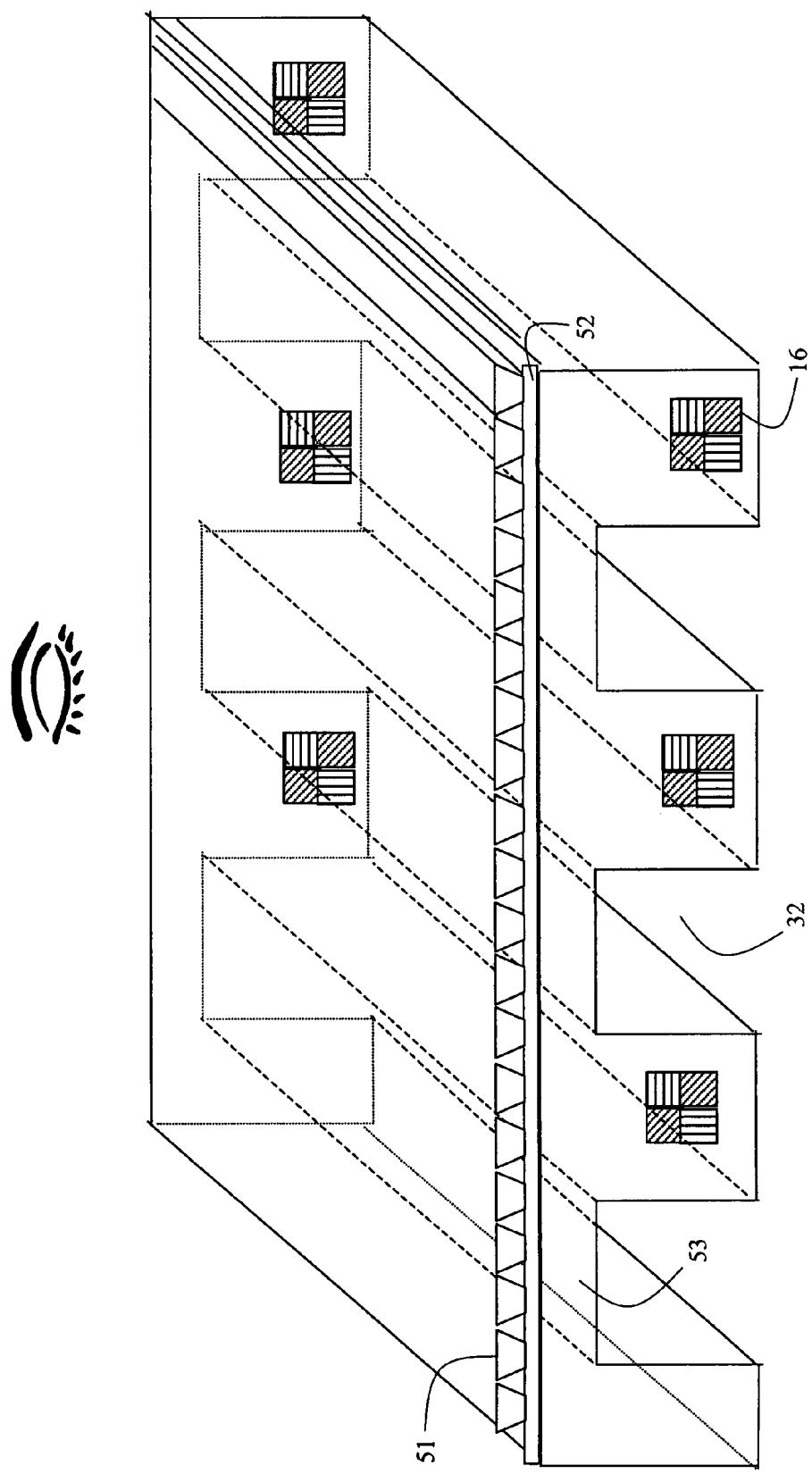
FIG. 5A is an elongated illuminator formed from a slab of polymer and has an integral bridge connecting open spaces air gap.
Figure 5B:
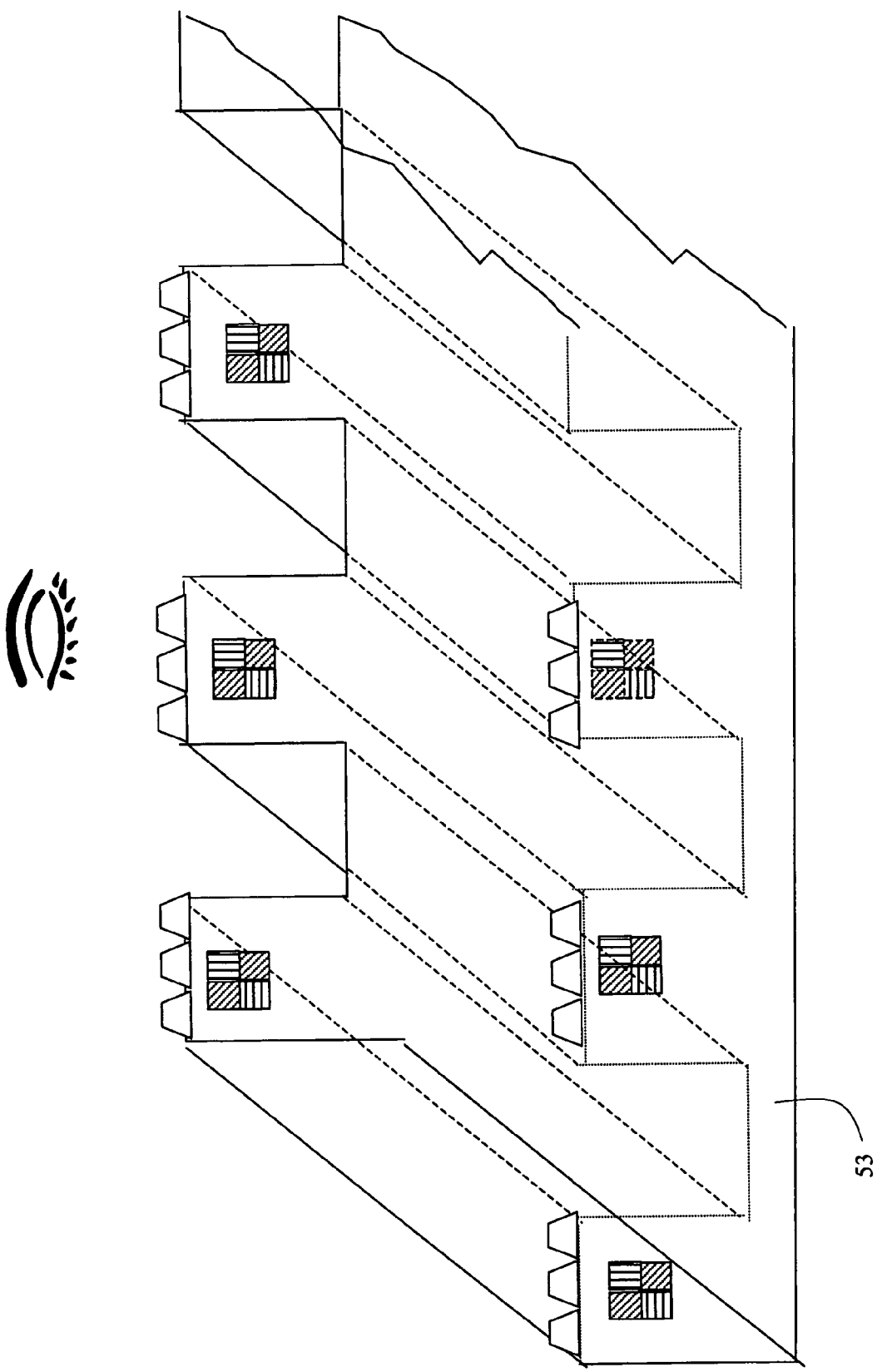
FIG. 5B an elongated illuminator with internal connecting bridge on the bottom and light extraction features attached to the top or view side.

FIG. 5B provides a elongated illuminator with internal connecting bridge 53 on the bottom and light extraction features 51 attached to the top or view side of the elongated illuminator.

Embodiment 5C

Figure 5C:
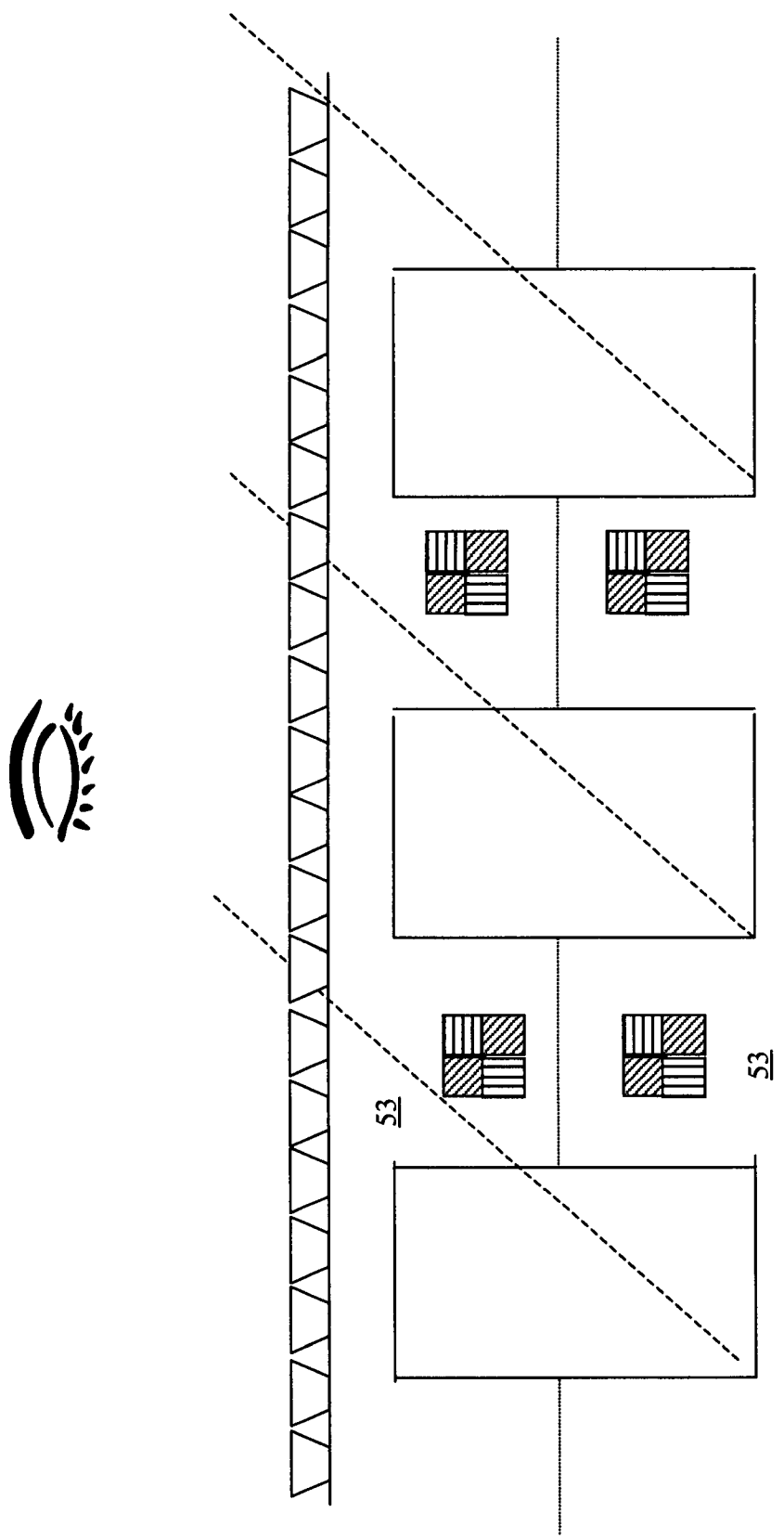
FIG. 5C is a elongated illuminator apparatus with internal bridges on both the view and non-view side.

FIG. 5C is a elongated illuminator apparatus with internal bridges 53 on both the view and non-view side. Also shown is a multiple array of light sources foe each light channel. While the air gap is surrounded by material on all sides, it may be desirable to form such an apparatus by placing two light bar on top of one another. Each elongated illuminator would be optically coupled by adhesive, melt fusing of the polymer.

Embodiment 6

Figure 6:
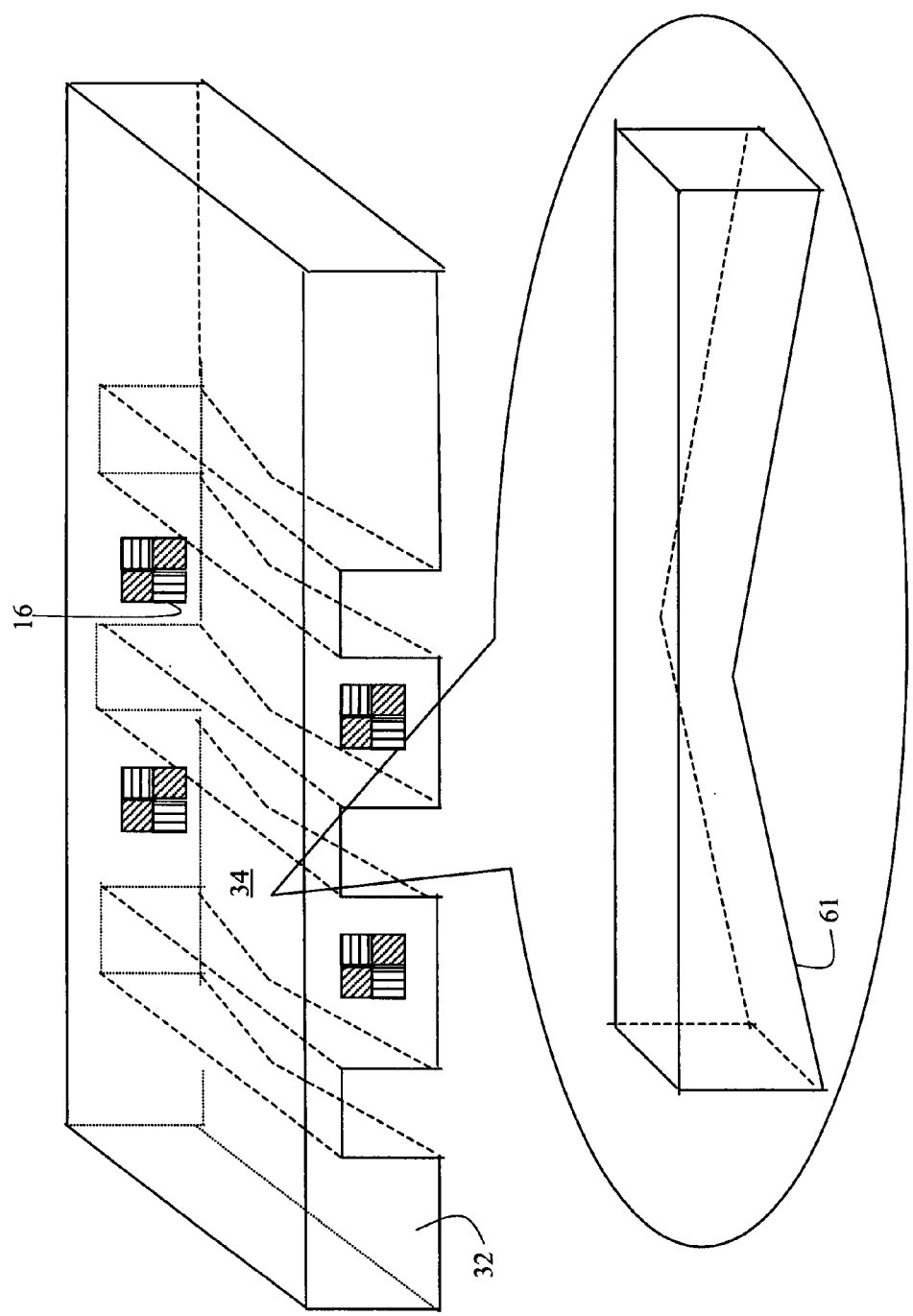
FIG. 6 an integral array of light bars with connecting bridges and solid elongated illuminator with a tapered channel.

FIG. 6 is a perspective view of an integral array of light bars with connecting bridges and solid elongated illuminator channel or section 34 are tapered from each light input end towards the center. There is also an enlarged side view of one section of the tapered elongated illuminator with an angled (tapered) non-view side 61. An air gap 32 provides a means to TIR the light from light source 16 within the width dimension of the integral array of light bars. The top side or viewing side provides a continuous pathway for the light to uniformize between light bars. The interconnecting continuous pathway furthermore provides added structural strength to the integral array of elongated illuminators.

Embodiment 7

Figure 7:
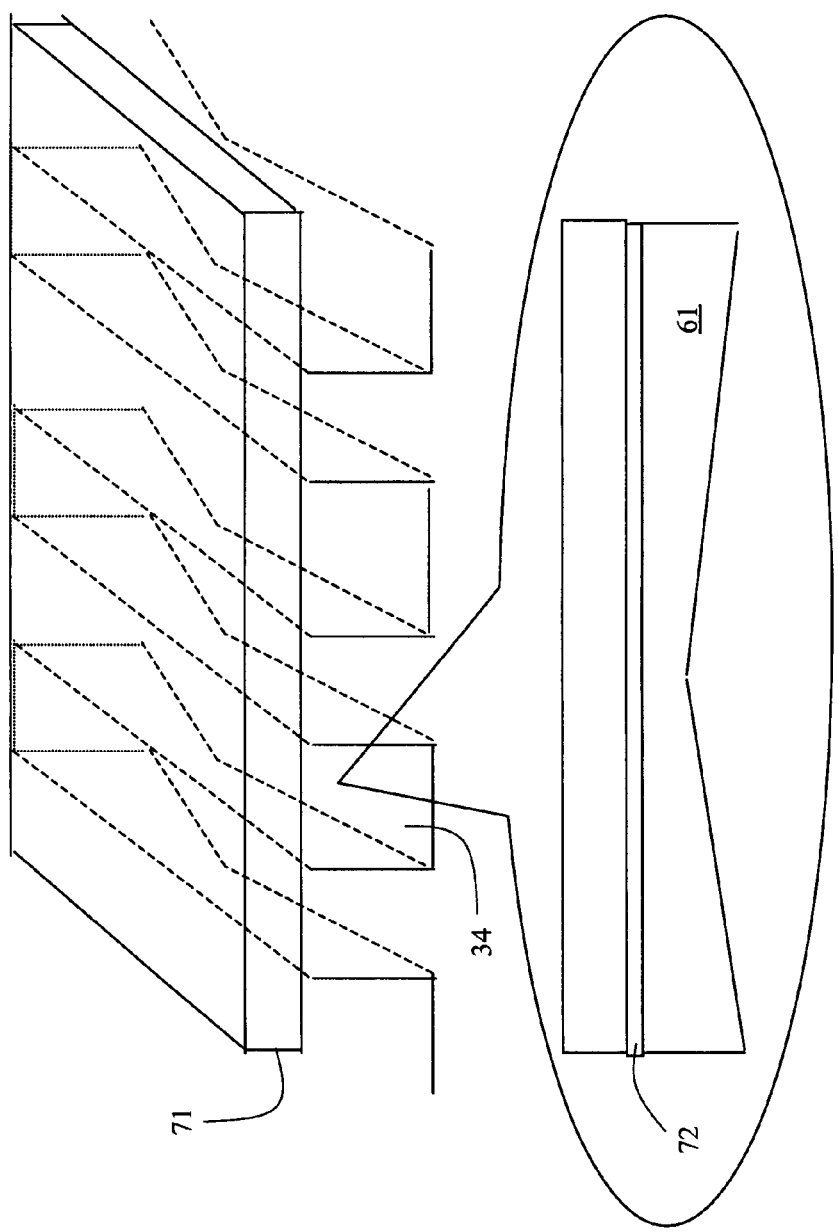
FIG. 7 an elongated illuminator with a view side slab that is formed by adhering light bars to a plate light guide plate.

FIG. 7 is perspective view of a elongated illuminator with a view side slab 71 similar to FIG. 6 except that it is formed by adhering light bars to a plate light guide plate. The bottom portion of the light bar as described previously may have a reflective surface, a prism-like structure, roughen bottom surface, reflective dots or other shape. The elongated illuminators may be optically coupled to the top slab by a variety of means such as an adhesive layer 72, melt fusing of the two polymers or other means to minimize light scattering or absorption. Such an arrangement will provide additional stiffness to keep the light is a parallel plane to the viewer.

Embodiment 8

Figure 8:
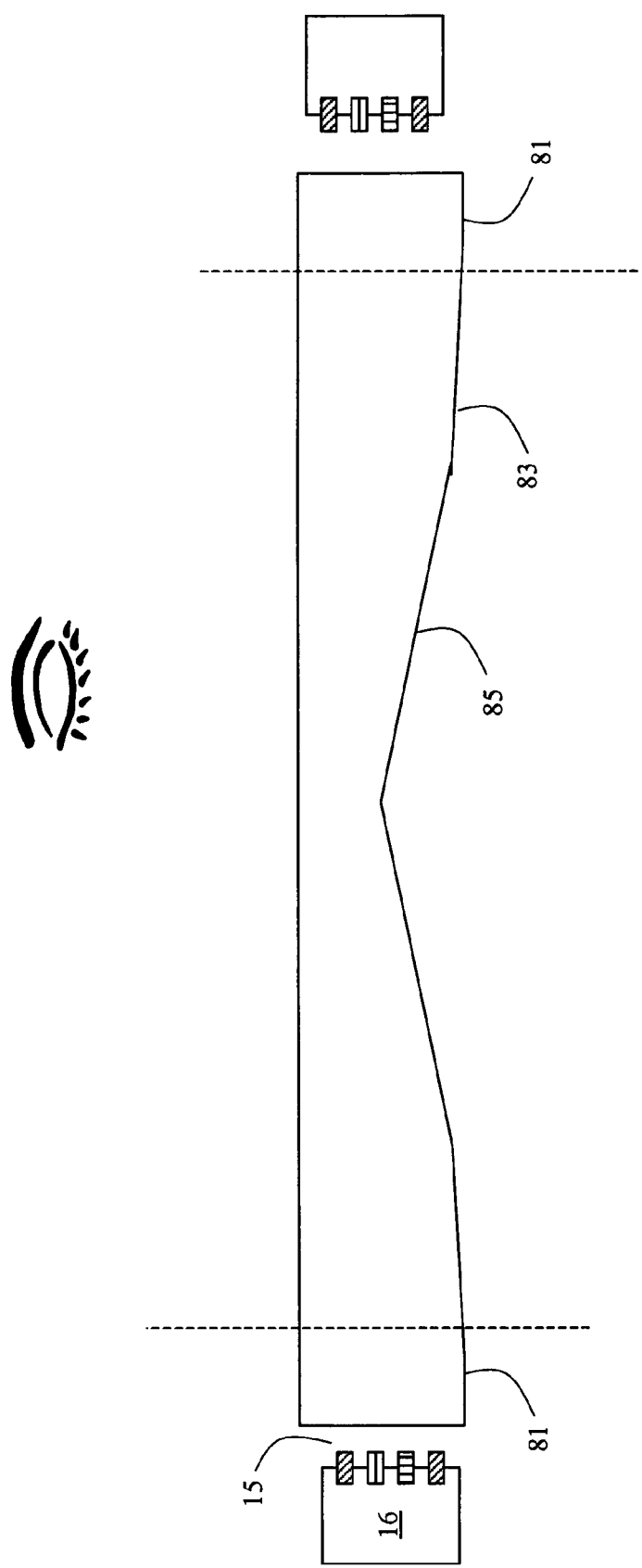
FIG. 8 is a tapered light bar with a tapered from each light input end.

FIG. 8 is a side view of a tapered light bar with a tapered from each light input end 15 with mixing section 81 depicted by the dotted line and the light input end of the elongated illuminator. Elongated illuminator is tapered from each light input end and has a compounded tapered from each end. The compound taper has two angled segments 83 with a slope A and 85 with slope B that vary from the mixing section to the center of the elongated illuminator.

Embodiment 9

Figure 9:
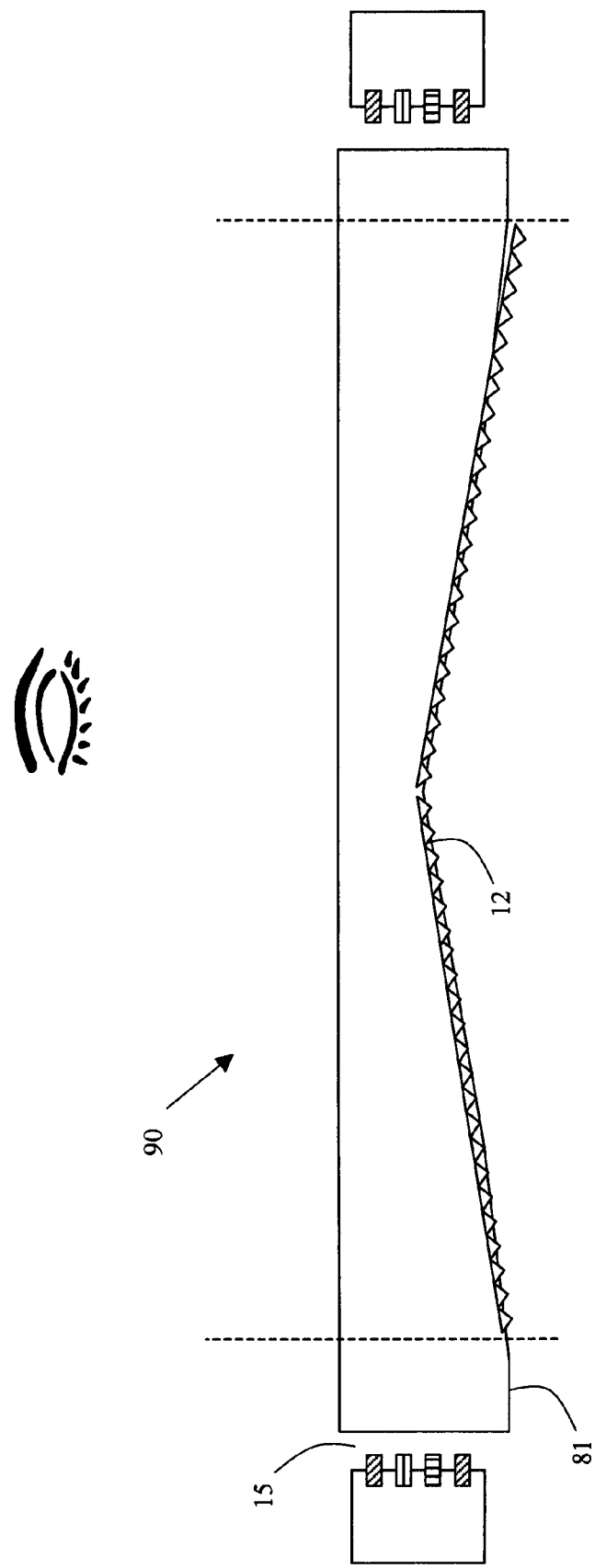
FIG. 9 is a tapered elongated illuminator with a mixing section and with a prism-like structure on the non-view side.

FIG. 9 is a side view of a tapered elongated illuminator 90 with a mixing section and with a prism-like structure on the non-view side that helps to redirect light to the view side surface with either constant or variable density as a function from the distance from the light input end. It should be noted that the view side surface may also have extraction or otherwise light redirecting features on or adhered to the surface.

Embodiment 10

Figure 10A:
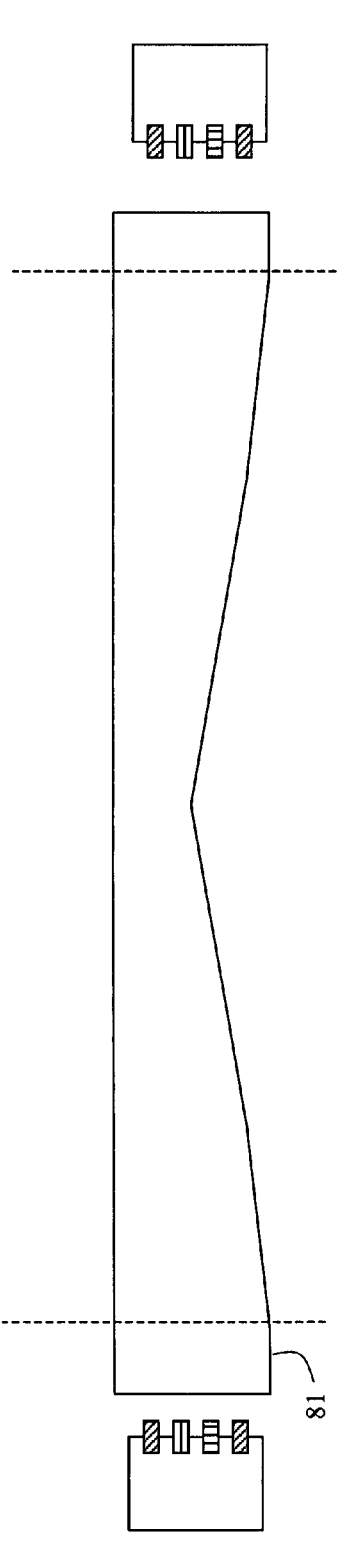
FIG. 10A is a side view of light bar
Figure 10B:
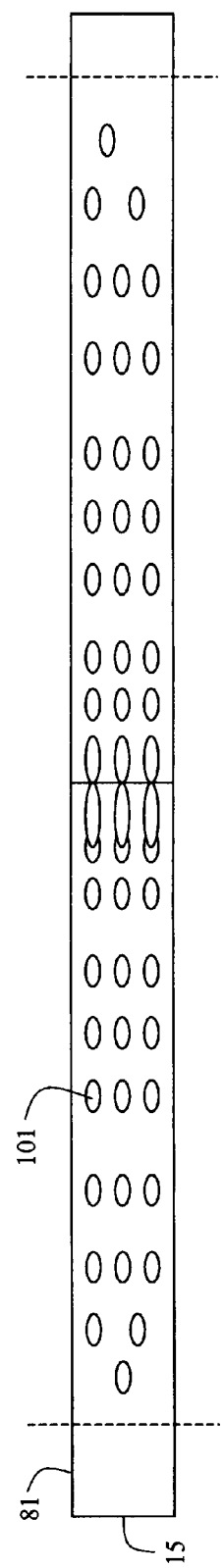
FIG. 10B is a top view of the elongated illuminator looking at the bottom side of the light bar and a series of reflective dots.

FIG. 10A is a side view another embodiment of a light bar and FIG. 10B is a top view of the elongated illuminator looking at the bottom side of the light bar and a series of reflective dots. As can been seen the density of the reflective dots 101 vary from the light input end and mixing section 81 to the center of the elongated illuminator. It should be noted that the reflective dots may be printed or otherwise from/placed on the non-view side surface. The reflective dots may be either specular or diffusive and they may be metallic-like or white. The size and shape may also be varied as a function of the distance from the light input end as well as the mixing section in order to achieve uniform light extraction and illumination from one end of the bar to the other. A similar embodiment anticipated would provide only one input light source, a mixing section and one taper and a reflector at the end.

Embodiment 11

Figure 11:
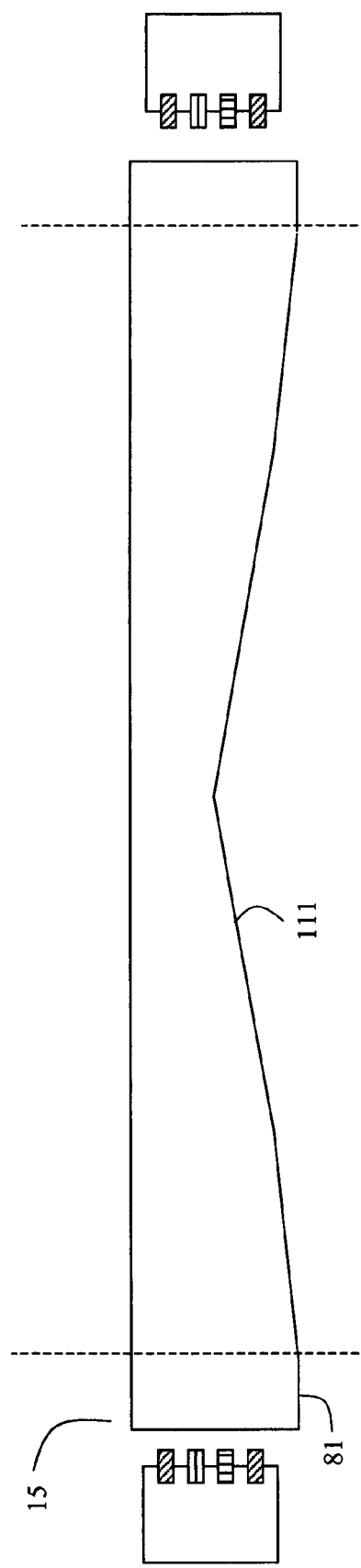
FIG. 11 is an elongated illuminator with a curved radius taper

FIG. 11 is a elongated illuminator with a curved radius taper 111 extending from the end of each light mixing section to the center. Having a constant radius is desire to provide uniform light extraction. Having a smooth transition along the length of the elongated illuminator is desirable for uniform extraction and preventing unwanted scattering of light in areas in which it is not desired.

Embodiment 12A, B, C and D

Figure 12A:
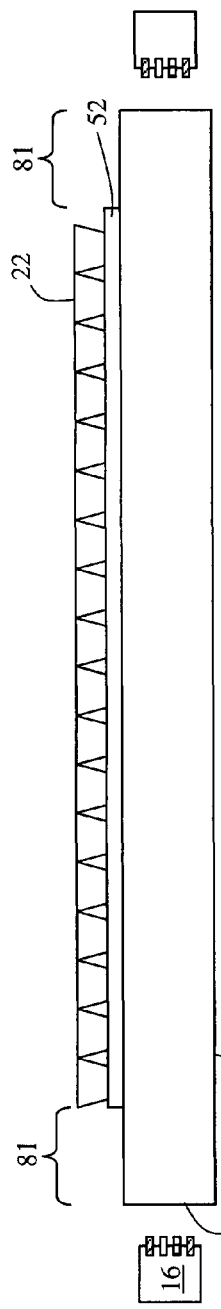
FIG. 12A is a elongated illuminator arrangement with a flat light input

FIG. 12A is a elongated illuminator arrangement with a flat light input end 15 on at least one end, at least light source 16, a light extraction feature on the view side of the elongated illuminator 22 and a means of optically coupling the features with adhesive layer 52 and at optional reflective means 121 on the non-view side of the elongated illuminator. The reflective means 121 may be continuous or variable in its reflective properties to aid in uniform light illumination along the length of the elongated illuminator. There is also a small region near the light input ends where there is no extraction or reflective features (at least very minimal). Such a region is useful in providing color mixing.

Figure 12B:
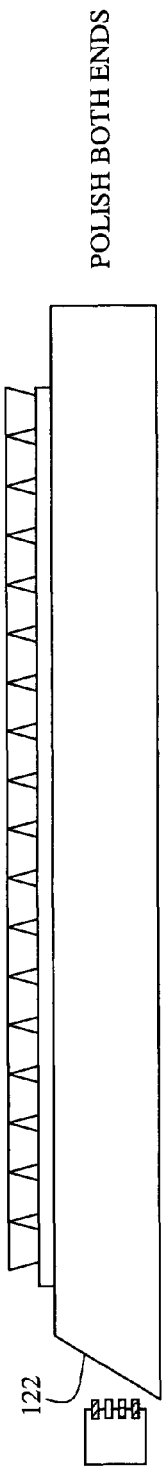
FIG. 12B is an elongated illuminator arrangement but it has at least one tapered light input end
Figure 12C:
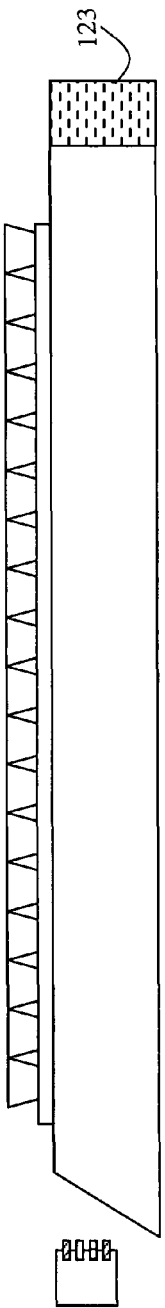
FIG. 12C is an elongated illuminator with specularly end reflective surface
Figure 12D:
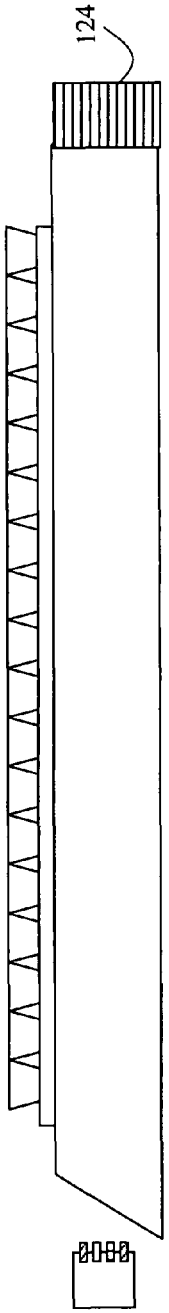
FIG. 12D is an elongated illuminator with scattering end reflective surface

FIG. 12B is a similar elongated illuminator arrangement but it has at least one tapered light input ends. While the taper is shown in one direction, other embodiments may have the taper angled in the other direction. Furthermore the angle may comprise more than one direction. FIG. 12C is a further extension of the useful elongated illuminator of this invention where a specularly reflective surface 123 is provided on the end opposite of the light source. FIG. 12D provides a scattering reflector 124 on the end opposite from the light source.

Embodiment 13A and B

Figure 13A:
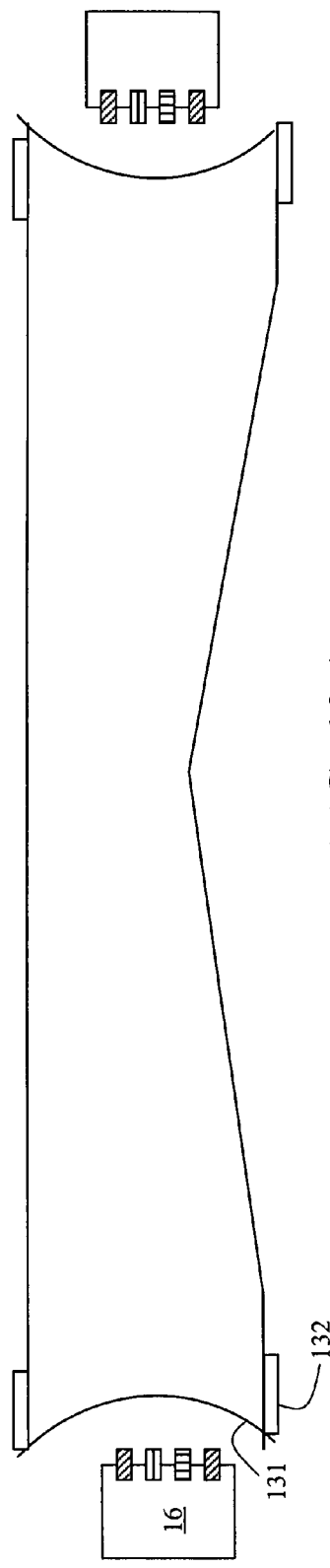
FIG. 13A is an elongated illuminator with a concave light entry surface

FIG. 13A is a elongated illuminator with a concave light entry surface 131 that provides light input entry into the elongated illuminator to collect and control the angle. An optional reflective surface 132 helps to redirect light from light source 16 into the elongated illuminator.

Figure 13B:
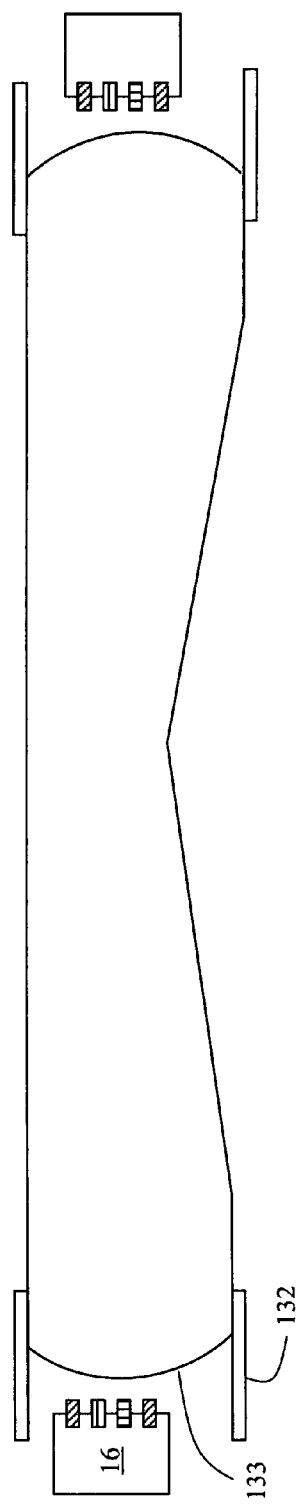
FIG. 13B is a light bar with a convex light entry surface

FIG. 13B is a light bar with a convex light entry surface 133 and reflective surface 132 that extends over light source 16 in order to capture and redirect into the elongated illuminator as much light as possible.

Embodiment 14

Figure 14A:
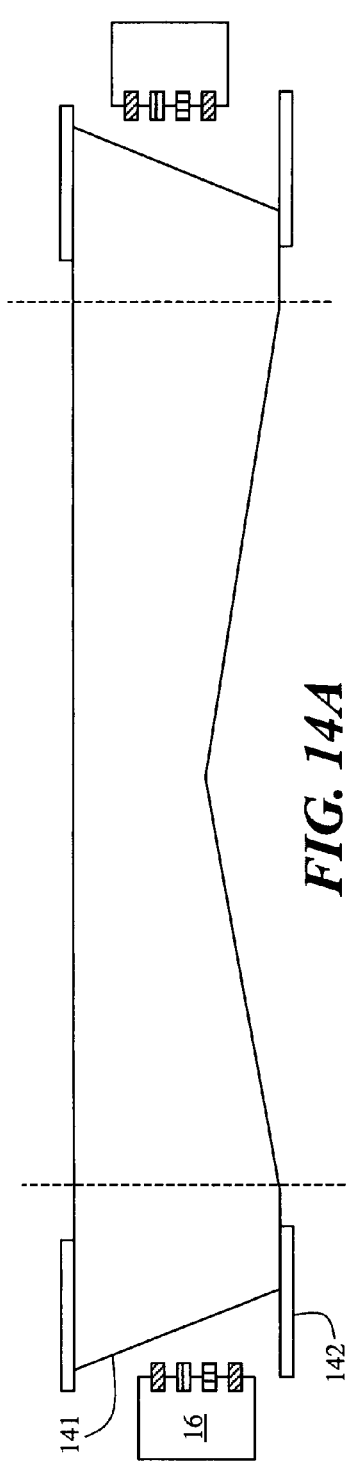
FIG. 14A is an elongated illuminator with a descending (top to bottom) tapered light input surface

FIG. 14A is a elongated illuminator with a descending (top to bottom) tapered light input surface 141 that accepts light from light source 16. Since 16 may be an LED source, it output is substantially hemispherical so it may be desirable to provide a reflective surface that helps to redirect light into the elongated illuminator at a critical TIR angle. The reflective surface may be specular or diffusive. In another embodiment surface 142 may comprise a structured that aids in light redirection. While the above figures are shown as having both ends the same design, it may be desirable to have different light input ends.

Figure 14B:
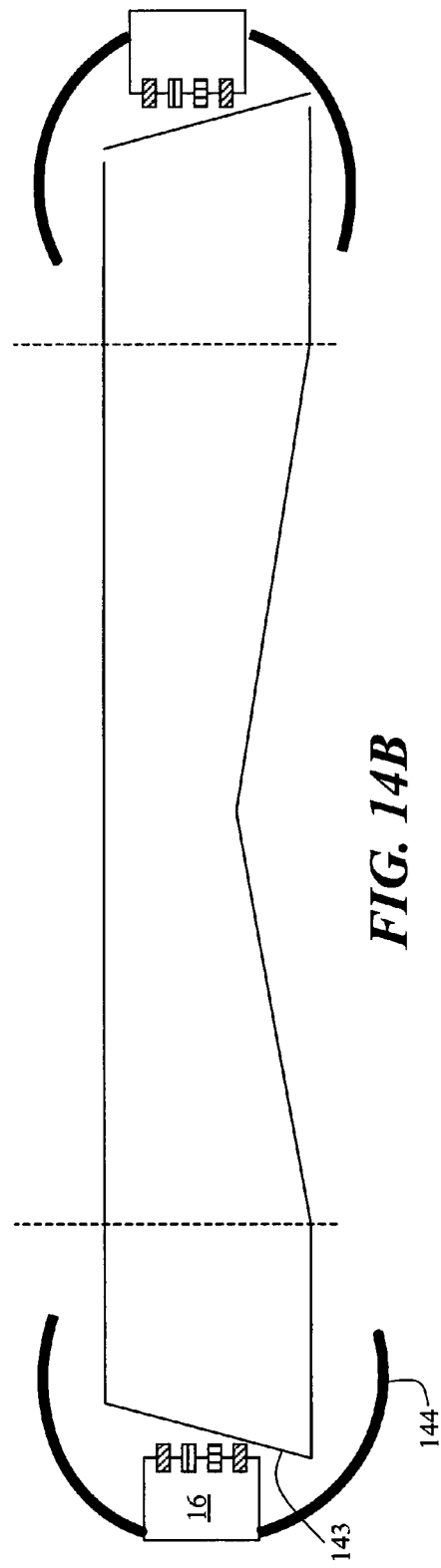
FIG. 14B is another elongated illuminator with a tapered light input surface with curved surface light input reflectors.

FIG. 14B is another elongated illuminator with a tapered light input surface 143 and light source 16. In some light sources the light projected is hemispherical and not all the light being put out will enter the light bar at the critical TIR angle and therefore be lost to the surrounding environment. To improve the efficient of this and other embodiments of this invention, it is be desirable to provide a means to redirect light that does not enter the elongated illuminator so it can enter at an angle that will allow TIR. Such a means may include a curved surface 144 that provides specular light reflection, a surface that provides diffuse reflection or a featured surface such as a prism.

Embodiment 15

Figure 15:
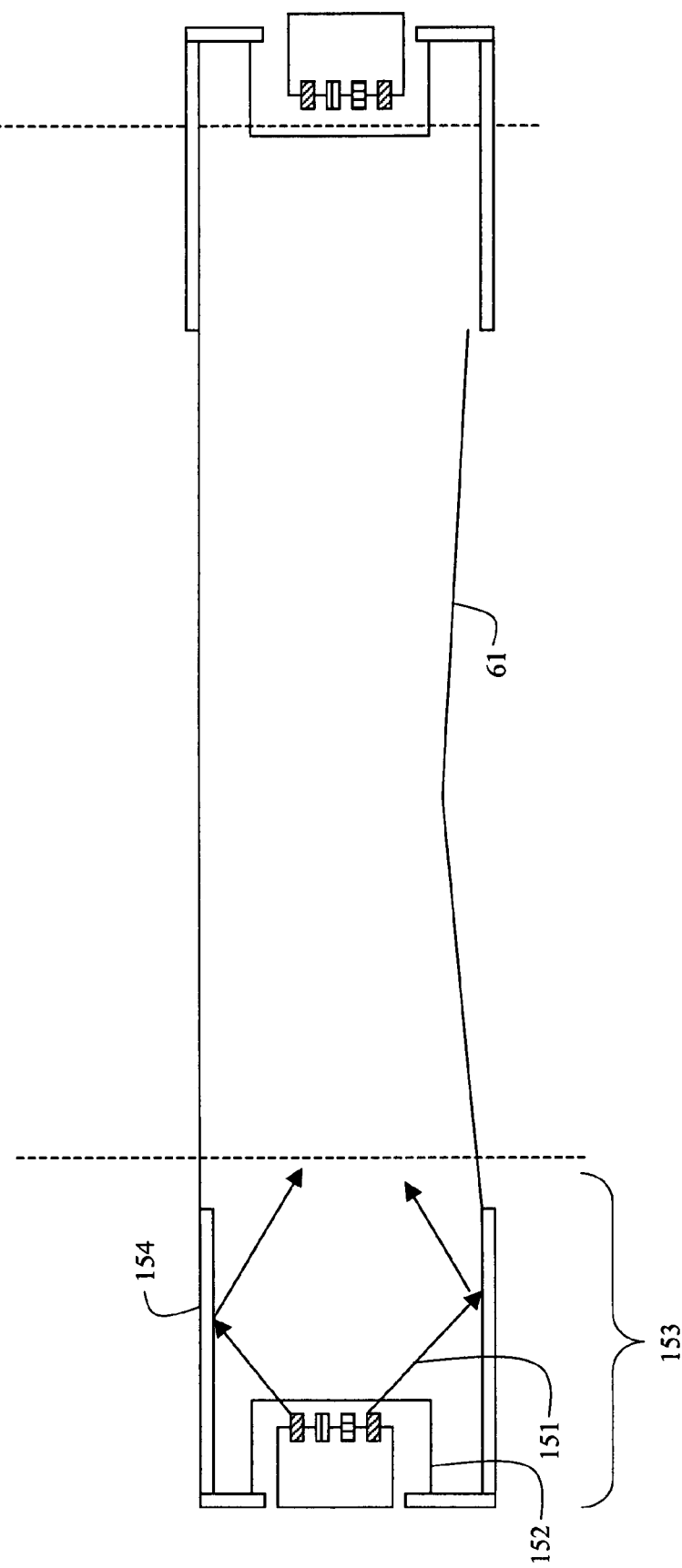
FIG. 15 has a recess light entry area with optional antireflective light input surface

FIG. 15 has a recess light entry area with optional antireflective light input surface 151 that enhances the amount of light entering the light bar. The antireflective surface may be on one or all sides of the recess area 152. The initial section 153 is a light mixing section and typically extends from the light input surface to the start of the taper. It should be noted that some additional mixing may occur throughout the length of the light bar and not exclusively within the mixing section. Additionally reflective surfaces 154 may be provides near and around the light input area of the elongated illuminator to help redirect light into the bar at a TIR angle that provides good mixing and uniform illumination. The tapered section helps to provide more uniform light extraction towards the view side. Such a light bar arrangement may also have light redirecting features such as but not limited to prism-like features, roughen surface, reflective surface. Such redirecting features may vary in density as a function of their distance from the light input end. Furthermore the taper or tapers form a compound tapered light bar. It should be noted in this figures and others within this invention are not limited by the general ratio or relative dimensions as shown in this side view cross section. In reality the length dimension is many time loner than the width dimension. The width dimension is enlarged in order to provide room for see the intended detail.

Embodiment 16

Figure 16:
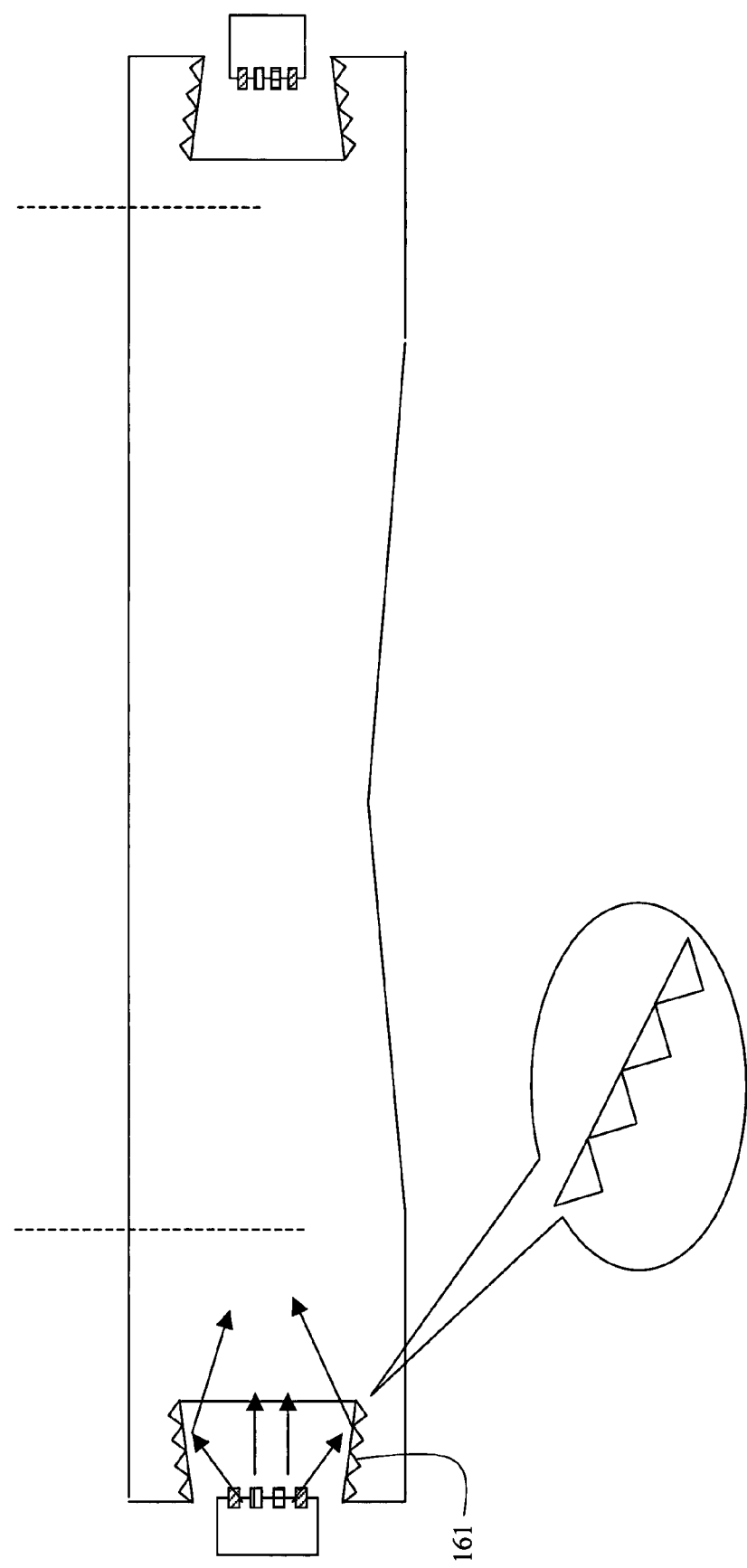
FIG. 16 is an elongated illuminator with recessed and prismatic feature in part of the recess light input

FIG. 16 is a elongated illuminator with recessed light input region with a tapered light input sides on the top and bottom of the recessed light input region. The tapered entry surface may be a reflective surface or prism-like feature to redirect the light to a critical TIR angle within the elongated illuminator. It should be noted that such a light input recess area may also have an anti reflective surface on one or more of the light input surface to help maximize the light entering the elongated illuminator.

Embodiment 17A and B

Figure 17B:
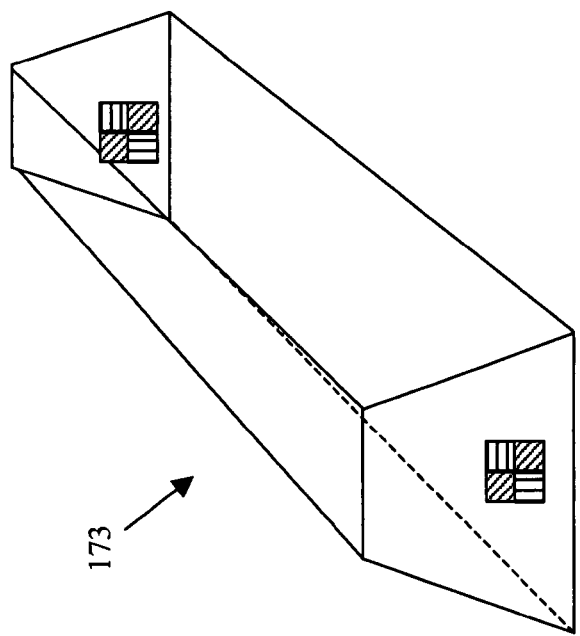
FIG. 17B is an inverted trapezoidal wedge elongated illuminator
Figure 17A:
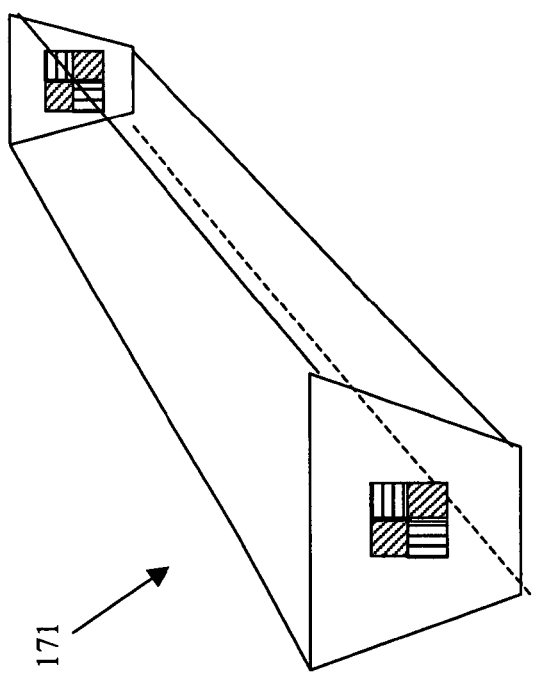
FIG. 17A is trapezoidal wedge elongated illuminator

FIG. 17A is FIG. 17A is trapezoidal wedge elongated illuminator configuration is a wider view angle side than non-view angle side. While it is shown with an angled bottom, it should be noted that a smooth radius may be used to allow to spread out laterally as it approaches the exit (view side) side of the elongated illuminator. This is useful because the light uniformity is provided over a wider footprint.

FIG. 17B is another design of a light bar 173 that provides a wider inlet for light towards the non-view side and the side gradual taper inward to help intensify or concentrate the light. Such a configuration provides improved light mixing.

Both FIG. 17A and B may have light mixing sections adjoining the light input entry surface. Additionally these configuration may be tapered towards the center, may have printed dots or other configurations to redirect light towards the view side.

Embodiment 18A, B, C and D

Figure 18B:
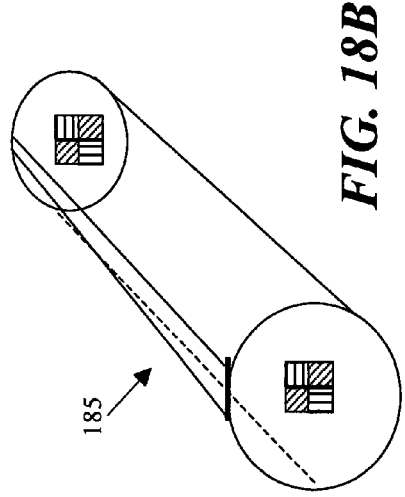
FIG. 18B is a circular elongated illuminator with a flat surface
Figure 18D:
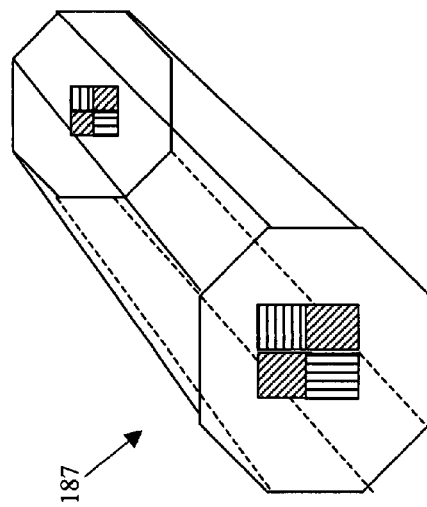
FIG. 18D is a multi-faceted elongated illuminator
Figure 18A:
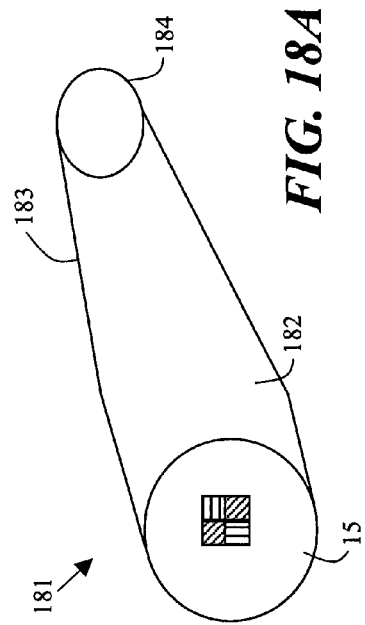
FIG. 18A is a circular elongated illuminator

FIG. 18A is perspective view of a circular elongated illuminator 181 with initial mixing section 182 and a tapered elongated section 183 with a reflector 184 at the opposite end of the light input end 15.

FIG. 18B is a perspective view of a circular elongated illuminator with a flat view side surface 185 that may additionally be roughen or comprise a light extraction feature. The circular elongated illuminator provides a means to minimize trapping light in the corners. The flat view side portion is desirable for adhering light extraction features and providing a broader cross section to direct light towards the viewer. As previously discussed the light extraction features may vary in shape and or density. The flattened surface on the circular elongated illuminator may also be tapered to help provide uniform light extraction.

Figure 18C:
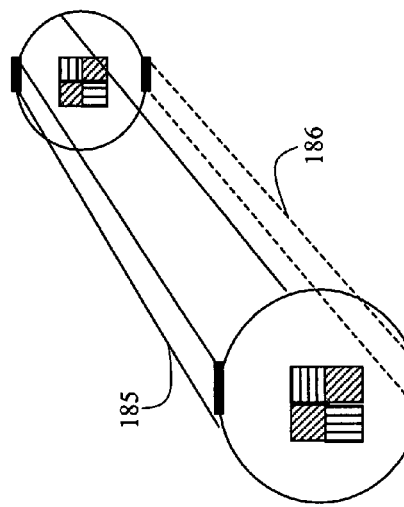
FIG. 18C is a circular elongated illuminator with two flat surfaces

FIG. 18C is a perspective view of a elongated illuminator but has at least two flattened surfaces (185 is the view side and 186 is the non-view side). The bottom or non-view side may be tapered from each light input end towards the center or if the elongated illuminator is only lit from one end, it may be tapered from the light input end towards the opposite end reflector. The non-view flattened surface may be further roughened to help mixing and scatter light or it may be printed with reflective dots and or other shapes.

FIG. 18D is a perspective view of another elongated illuminator embodiment of this invention with a multi-facets 187. While this figure shows 8 sides other configurations with more or less may be useful.

Figure 18F:
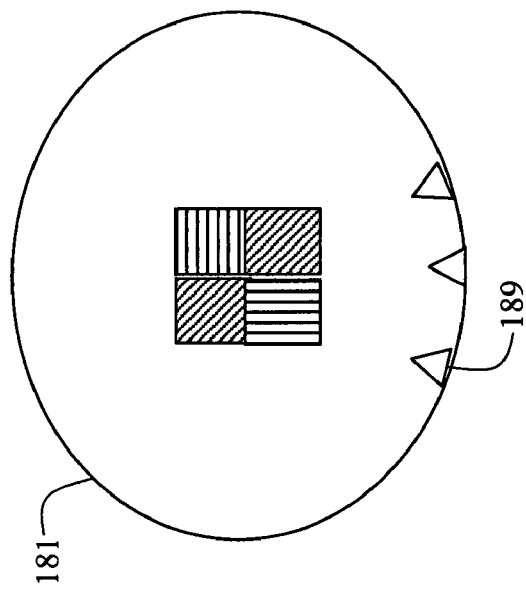
FIG. 18E is a elongated illuminator with scattering features FIG. 18F with scattering features arranged in an arc
Figure 18E:
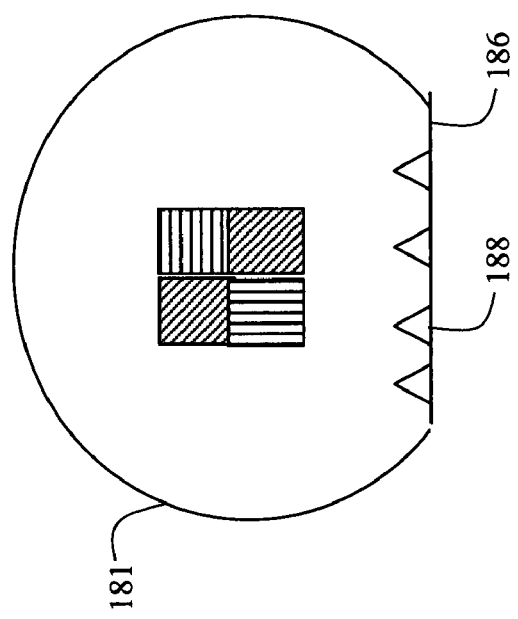

FIG. 18E and 18F are end views of other embodiments for elongated illuminators that have good light mixing and good length light uniformity. In FIG. 18E circular elongated illuminator 181 has a non-view side flat surface that has a series of light scattering features 188 that have been recessed into the elongated illuminator. The features shown are conical in shape in that they are wider on the surface of the elongated illuminator as opposed the part that is on the interior of the elongated illuminator. The scattering feature may also trapezoidal with a flat surface as opposed to a point on the interior. The number, density, shape, size, depth of the scattering feature may vary from the light input end to the center for a elongated illuminator that is lit from both ends or may vary from the light input side to the end for a elongated illuminator that in lit only from one end. In another embodiment the indents may be replaced with reflective dots or other patterns or even a continuous reflector is the elongated illuminators are also tapered.

In FIG. 18F the elongated illuminator does not have a flat bottom surface but the light scattering features 189 are made directly into the arc of the elongated illuminator. As discussed above the indents may vary in their size, density, shape, and or depth as a function of the distance from the light input end.

It should also be noted that a combination of indents on a flay and on part of the arc may also be useful.

Embodiment 19A, B, C and D

Figures 19A, 19B, 19C, 19D:
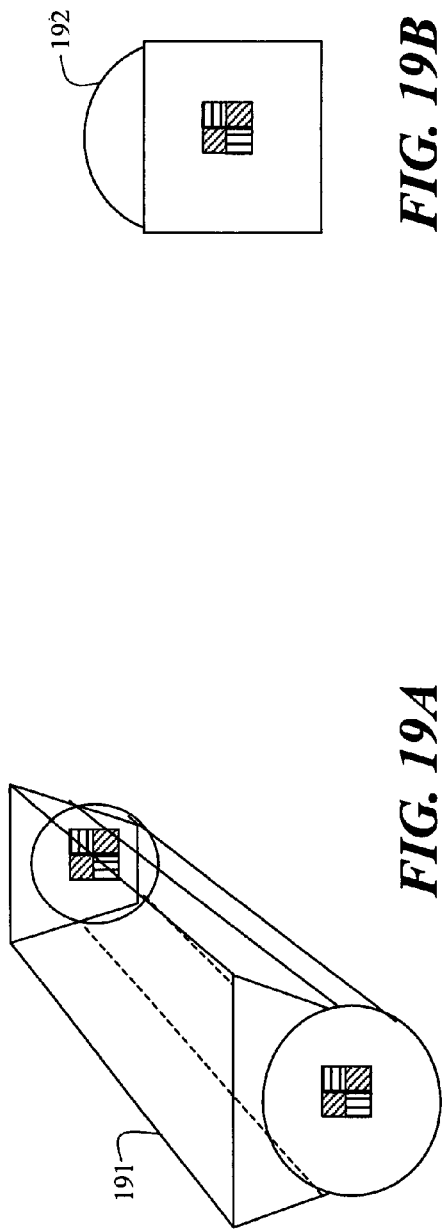
FIG. 19A is a circular elongated illuminator with distribution cap
FIG. 19B is a elongated illuminator with a lens shape on the view side
FIG. 19C is a lightbar with a convex surface
FIG. 19D is a elongated illuminator with a distribution profile on the view side

FIG. 19A is a perspective view of a circular elongated illuminator with distribution cap 191. The distribution cap helps to spread light over a wider area.

FIG. 19B is an end cross sectional view of a elongated illuminator with a lens-like surface structure 192 that can help focus light.

FIG. 19C is a elongated illuminator with a convex surface 193 on the view side. The advantage of this type elongated illuminator is that it helps redirect light.

FIG. 19D is an end cross section of a elongated illuminator with a view side flare 194 that helps to distribute light in a wider cross section.

Embodiment 20

Figure 20:
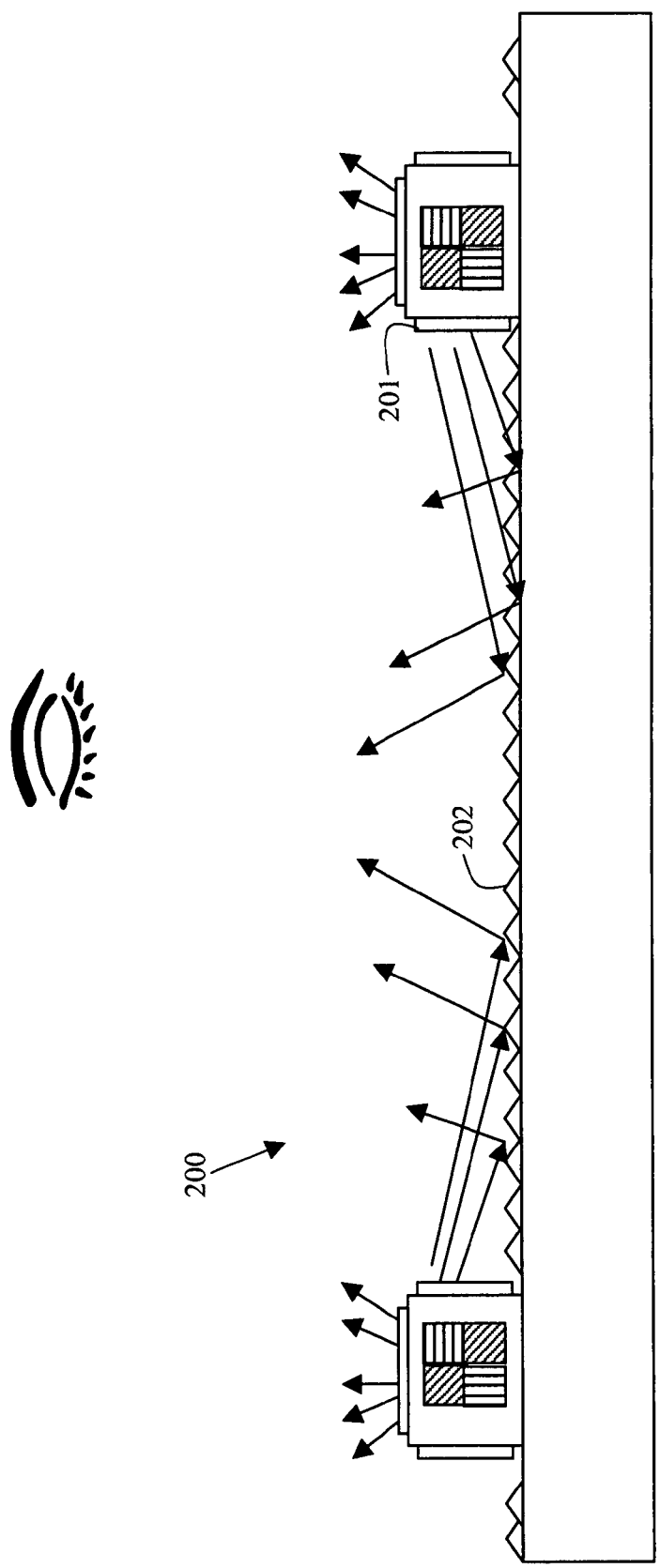
FIG. 20 is a backlight with an array of elongated illuminators and surface scattering between them.

FIG. 20 is an end cross sectional view of a backlight 200 with an array of elongated illuminators with a means of extracting light on more than one surface 201 and region between the elongated illuminators 202 that provides redirecting the light. The region between the elongated illuminators may be specularly reflective, diffusely reflective, prismatic or otherwise featured. The region between the elongated illuminators may vary in its redirecting properties in order to provide uniform color temperature and illumination. In those embodiments with a feature the shape, size and or density may be varied.

Embodiment 21

Figure 21:
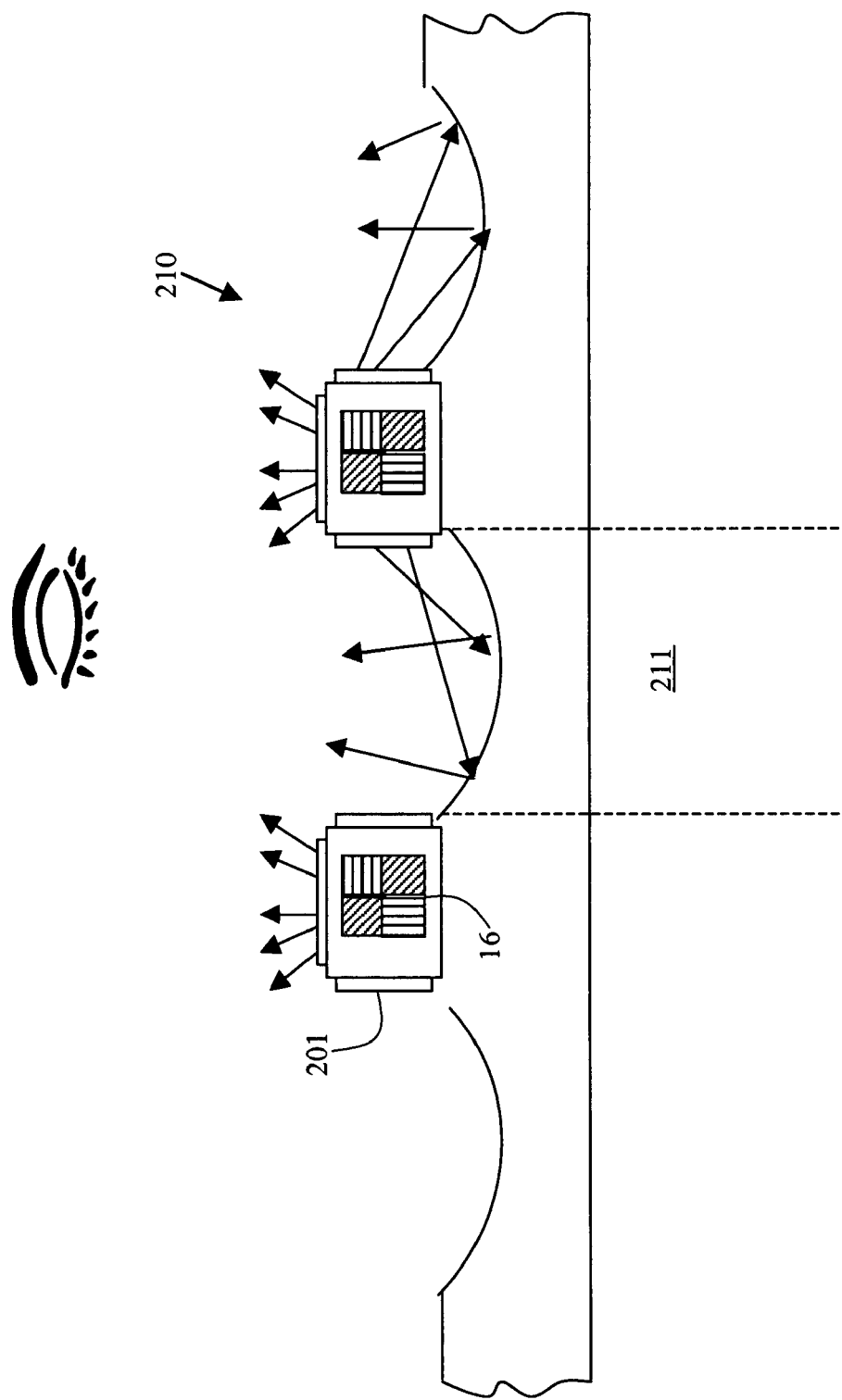
FIG. 21 is a backlight with a curve section between the elongated illuminators

FIG. 21 is a cross sectional view of another means of redirecting and spreading light in a backlight array 210. Elongated illuminators have more than light extraction side 201 are provide with controlled side leakage in conjunction with a curved reflector region 211 between the backlights. It should be noted that this and other figures are not drawn to scale nor should they be interpreted as being near relative scale. The curved region between light bars is shaped to provide redirecting of the light towards the view side of the in a manner to provide uniform light illumination. The light extraction means on the light bars may be varied along their length to provide uniform lighting. Typically the density of the extraction feature is less near the light source and higher the further the distance from the light source. This embodiment may further have a light source on each end or on one end with a reflector on the opposite end of the elongated illuminator. The curved portion of the region between elongated illuminators may be specularly or diffusely reflective. This region may also have also be roughened or patterned with a redirecting feature.

Embodiment 22

Figure 22:
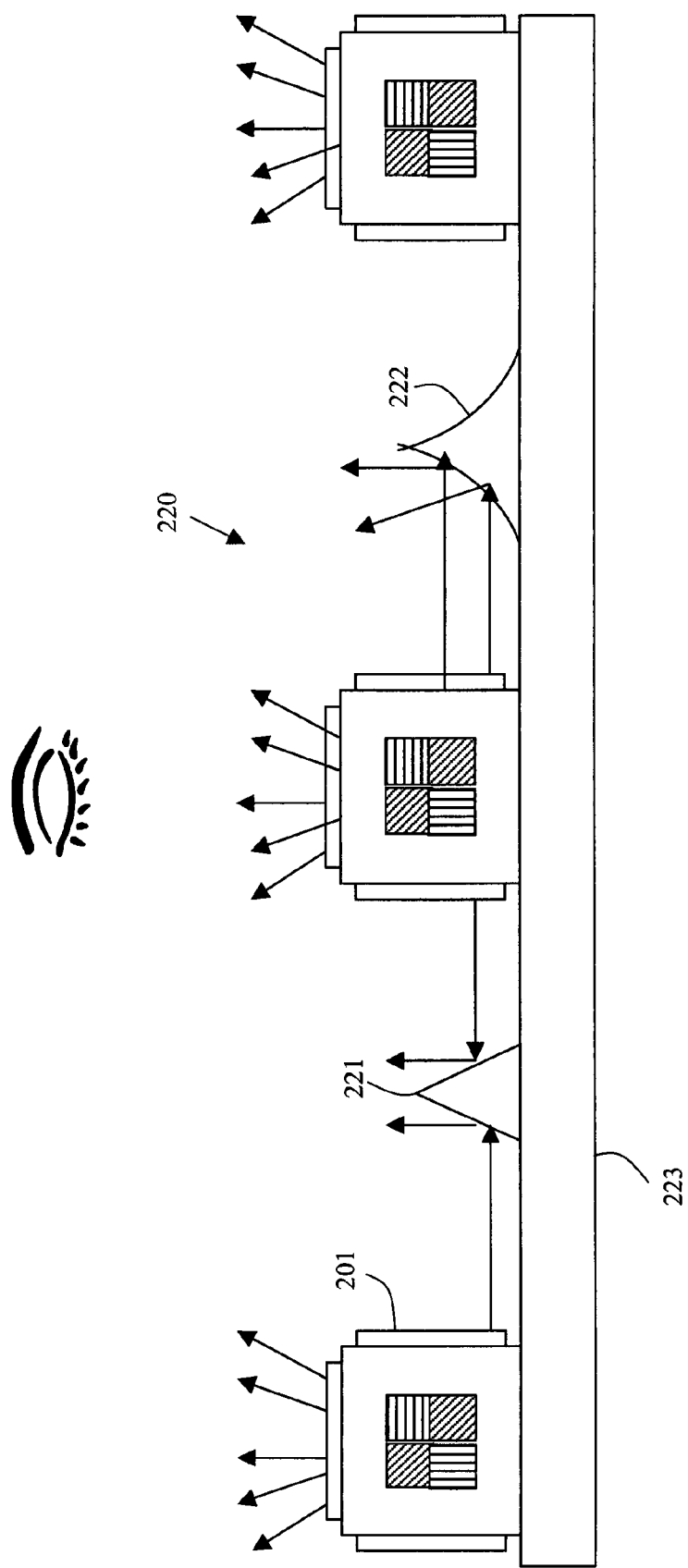
FIG. 22 is a backlight with redirection features between the elongated illuminators

FIG. 22 is a backlight array 220 with elongated illuminators that have multiple sides with extraction means 201. In the region between elongated illuminators is a shaped reflector 221 and or radius reflector 222 that provides a means to redirect light towards the view side. While only one reflector is shown between a set of elongated illuminators, there may be more than one and they may vary in shape and size. These reflector features while shown to be large in relation to the elongated illuminator may be much smaller or micro in scale. The base 223 may also be reflective.

Embodiment 23

Figure 23:
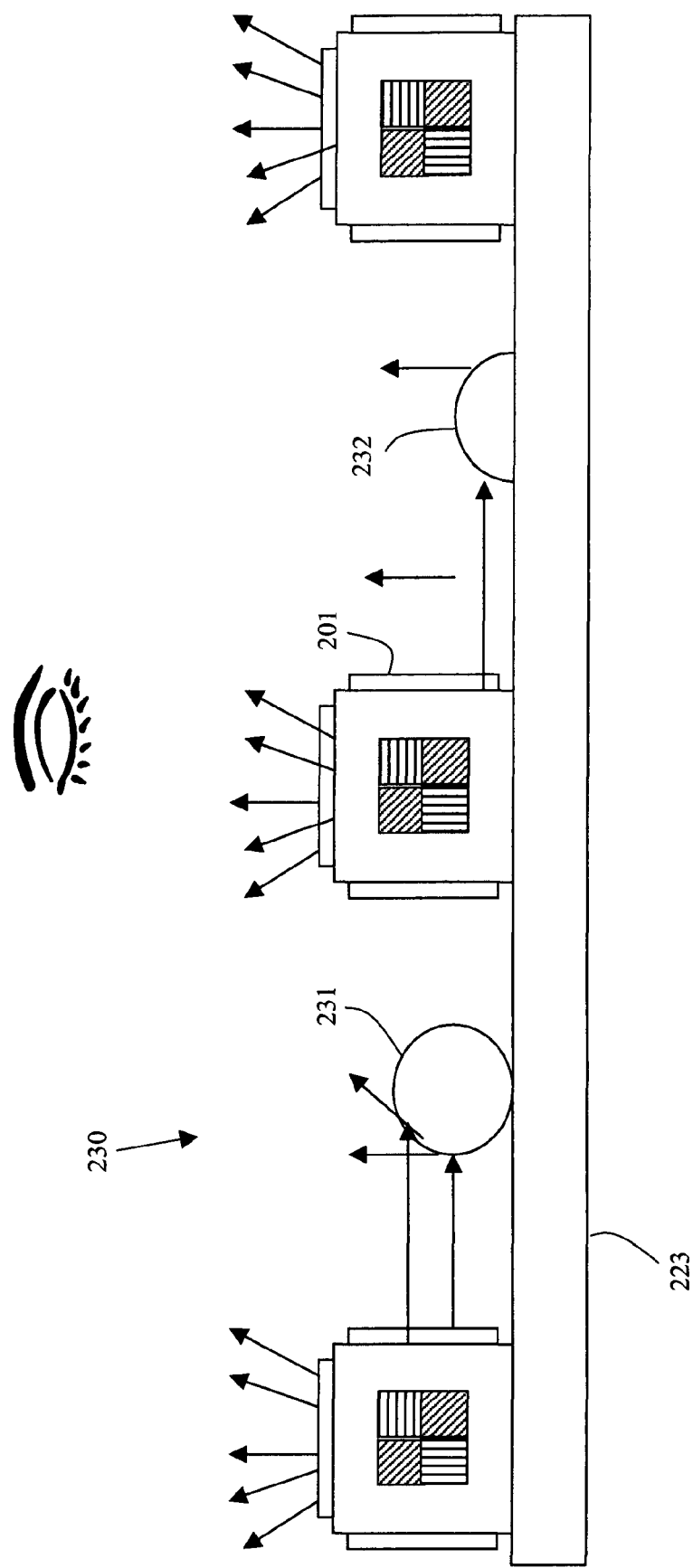
FIG. 23 is a backlight with redirection features between the elongated illuminators

FIG. 23 is a backlight array 230 with elongated illuminators that have multiple sides with extraction means 201. In the region between elongated illuminators is a shaped reflector 231 and or 232 that provides a means to redirect light towards the view side. While only one reflector is shown between a set of elongated illuminators, there may be more than one and they may vary in shape and size. These reflector features while shown to be large in relation to the elongated illuminator may be much smaller or micro in scale. The base 223 may also be reflective.

Embodiment 24

Figure 24:
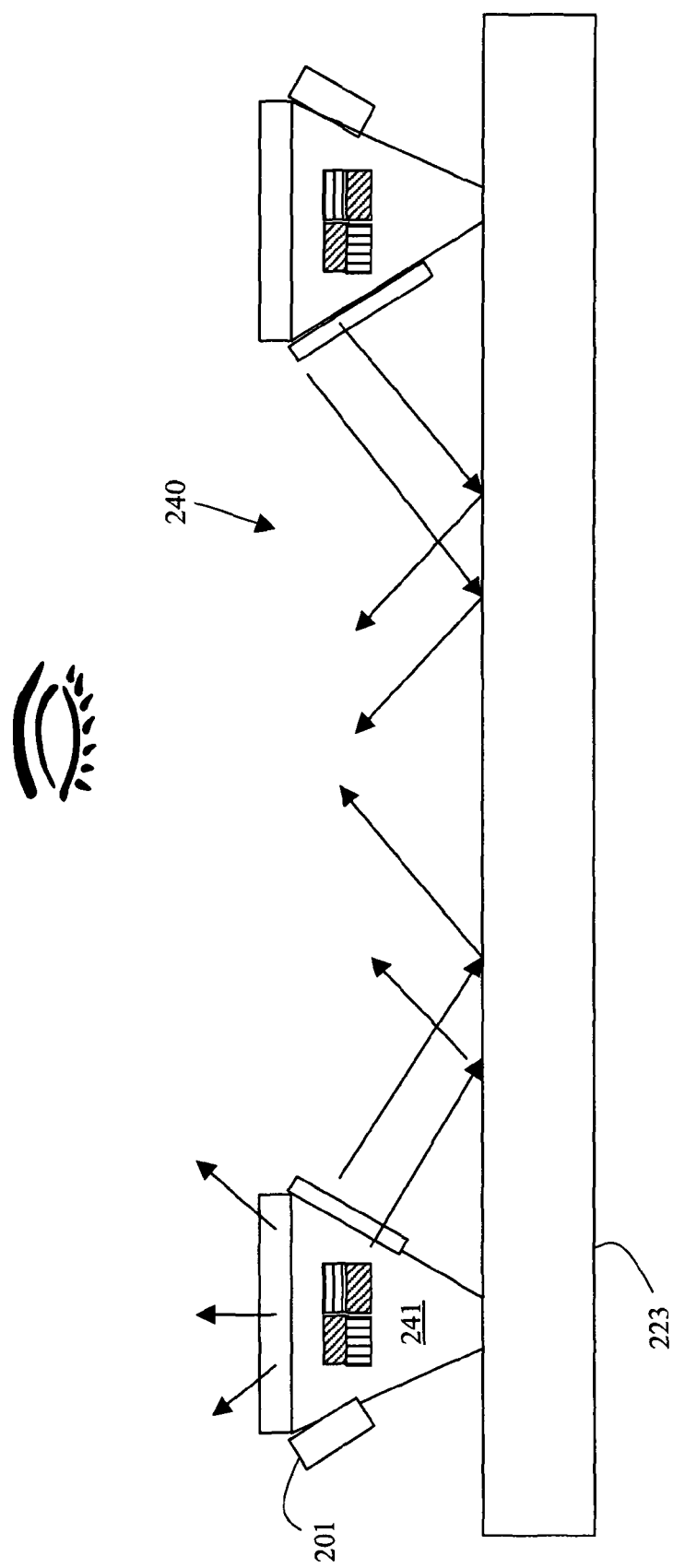
FIG. 24 is a back light with trapezoidal elongated illuminators

FIG. 24 is another backlight array with trapezoidal shaped light bars 241 with light extraction means 201 on more than one side. As shown the light extraction feature may be on all or part of the side surface of the elongated illuminator. The base 223 may be reflective to provide light redirection and light distribution.

Embodiment 25A and B

Figure 25A:
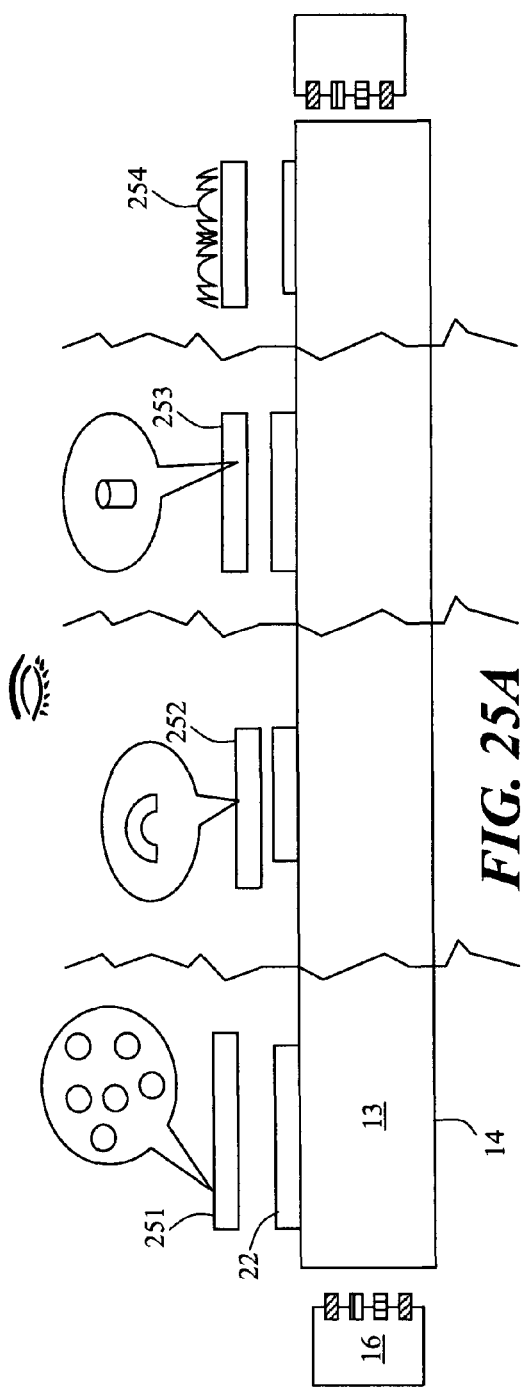
FIG. 25A is a light bar with various view side film or features
Figure 25B:
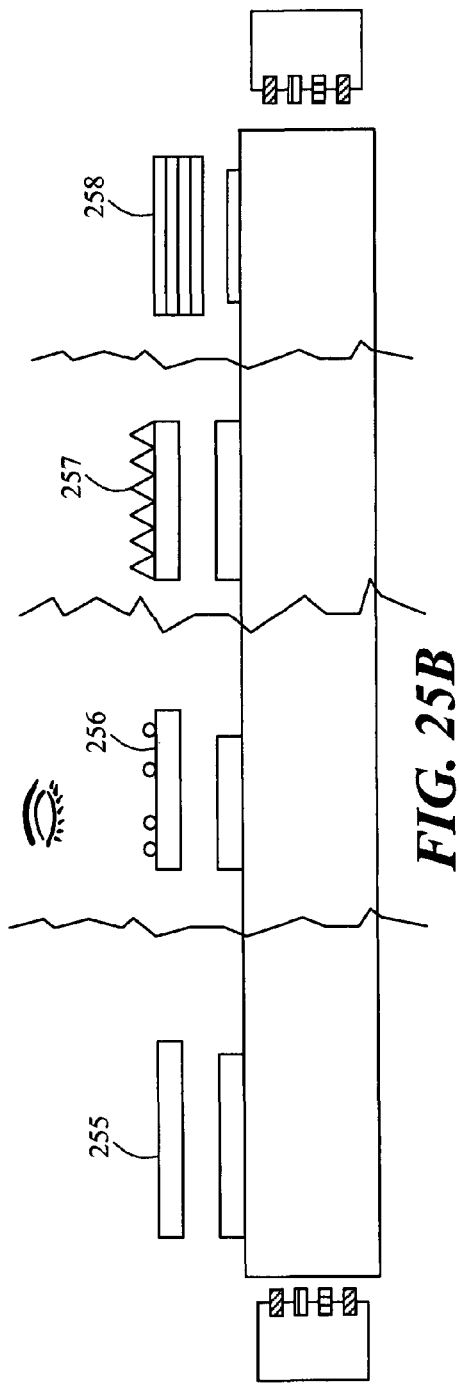
FIG. 25B is a elongated illuminator with various view side features or films

FIG. 25A and 25B is a side cross section of a elongated illuminator with view side 13 and non-view side 14, light source 16 and surface extraction means 22 for light extraction. Additional there is a series of other functional films or layers (can be separate or integral) that can be used in combination with the elongated illuminator and view side extraction means. It should be noted that while not shown, the elongated illuminator may be of other size, shape and design as shown in previous figures, the non-view side may also have added functionality to provide light redirection to help provide uniform light mixing and illumination. While they are shown with a space and above the light extraction means, it should be noted that they be on top of (in contact with) or optically coupled with the light extraction means. The functionality may be by itself or in combination one or more functionalities. The added functionality may include but is not limited to polarization fibers 251, lenticular film 252, cylinder film 253, fresnel lens film 254, bulk diffuser 255 (may be voided and or filled polymer film), beaded diffuser 256, light enhancing film 257, reflective polarization film 258. These and other functionality may in as a single film or layer and one or more functionality may be combined in a single film. Although non shown the backlight may also include light modulation, light spreading, light columation, light absorbing.

Embodiment 26

Figure 26:
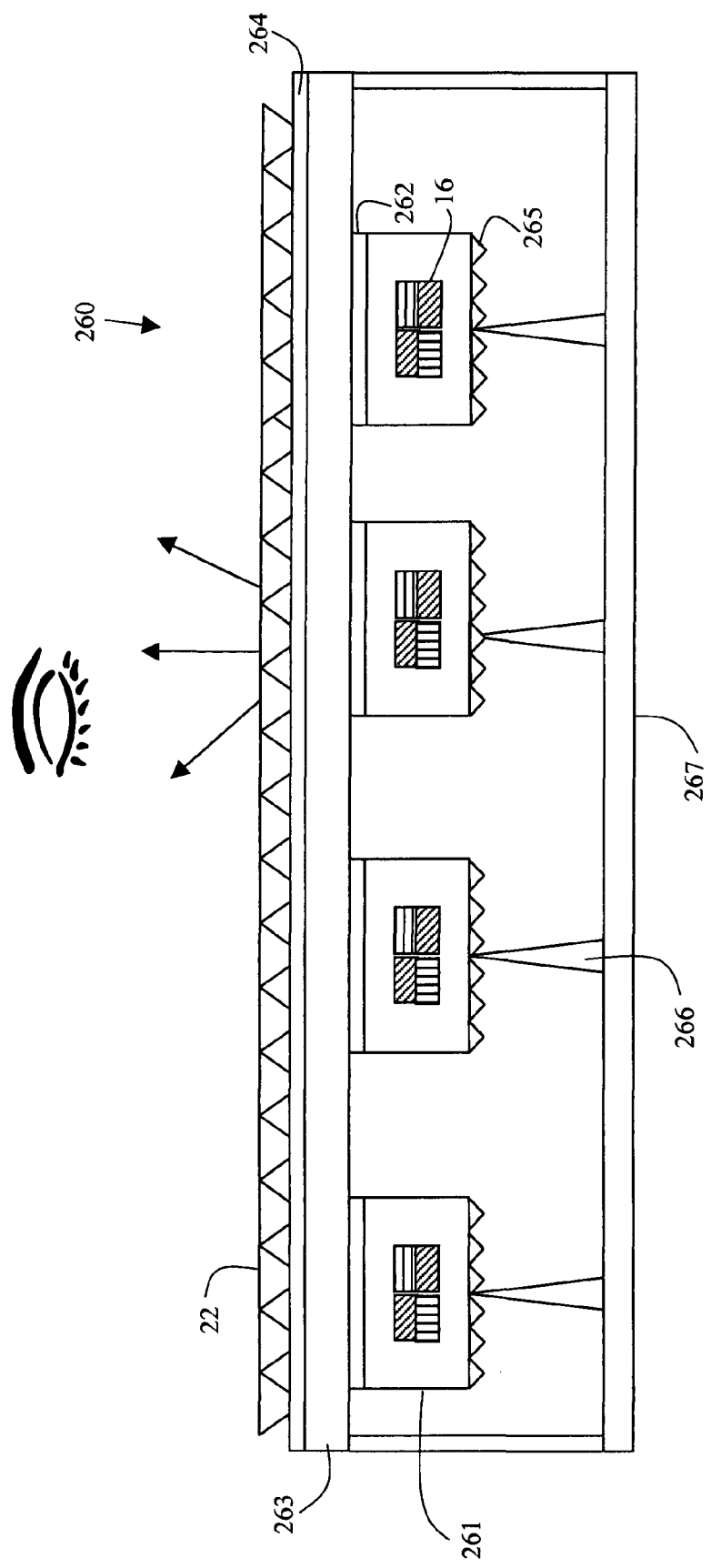
FIG. 26 is a backlight with the light bar in a case

FIG. 26 is an end view of a backlight array 260 with elongated illuminator 261 with light source. The light bars are adhered to the bottom of transparent plate 263 with transparent adhesive layer 262. Additionally there is a second adhesive layer 264 and light extraction features 22 on the view side of the array. The elongated illuminators also have a prismatic feature 265 on the non-view side to aid in the extraction of light. Also shown is an optional standoff 266 that provides support to the elongated illuminator and transparent plate. The standoffs help to prevent sagging and to keep the various part flat and at a uniform distance from other parts of an LCD display such as LCD array, polarizer and view side display (not shown). The elongated illuminators are enclosed in a case or box 267 that has reflective surfaces. As noted in previous discussions the light bars may vary in the shape, size and side profile including but not limited to tapers, light mix sections. The light source may also include means to maximize the coupling of light into the elongated illuminator including but not limited to providing a means to capture and redirect light into the bar at an appropriate TIR angle. By adhering the elongated illuminator to a transparent plate, an improvement is made to provide a means to optical couple and help to distribute light across the width the width of the light plate and the regions between the elongated illuminators.

Embodiment 27

Figure 27:
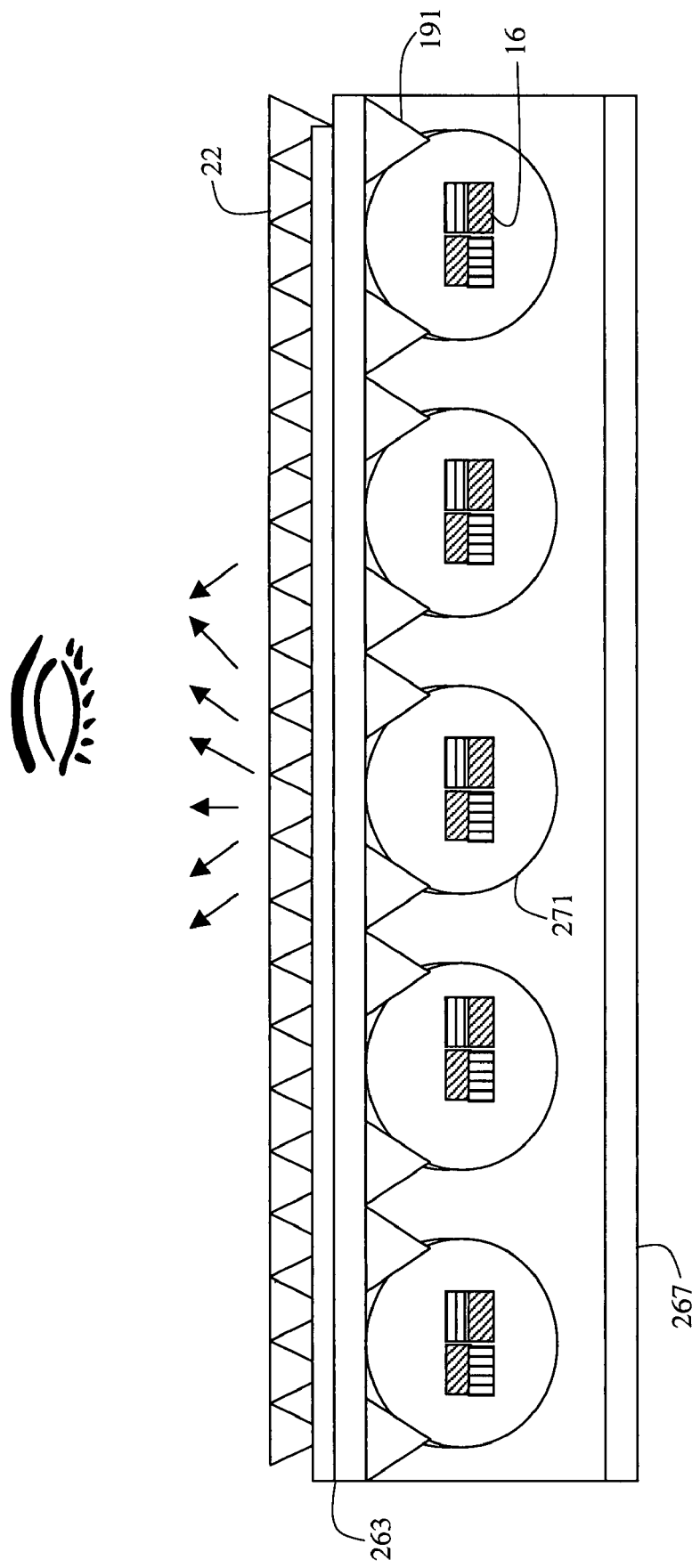
FIG. 27 is a backlight with circular elongated illuminators and lateral distribution means

FIG. 27 is an end cross section of a backlight array with curved elongated illuminators 271. The top portion of the elongated illuminators have been optically coupled over a large arc of the circle so as to provide a light distribution pathway 191 for the light to spread to regions between the elongated illuminators towards the extraction film. The light distribution pathway or cap on the view side of the elongated illuminators is optically coupled to a transparent plate 263. Curved type elongated illuminators are useful because the curved profile does not trap light in regions that are difficult to extract. Also by providing a pathway on the view side of the curved elongated illuminators that is optically coupled by a profile that allows light to be distributed between the elongated illuminators, more uniform light can be extracted and sent towards the viewer. Light source 16 is couples into one or both ends of elongated illuminator 271. If only on one end, there may be an optional mirror reflector on the side opposite to the light source. The light distribution pathway or cap on the view side of the elongated illuminators may be molded as an integral part of the transparent plate 263 and the elongated illuminators adhered to the cap. Such a configuration would be useful in eliminating a needed for a linear fresnel.

Embodiment 28

Figure 28:
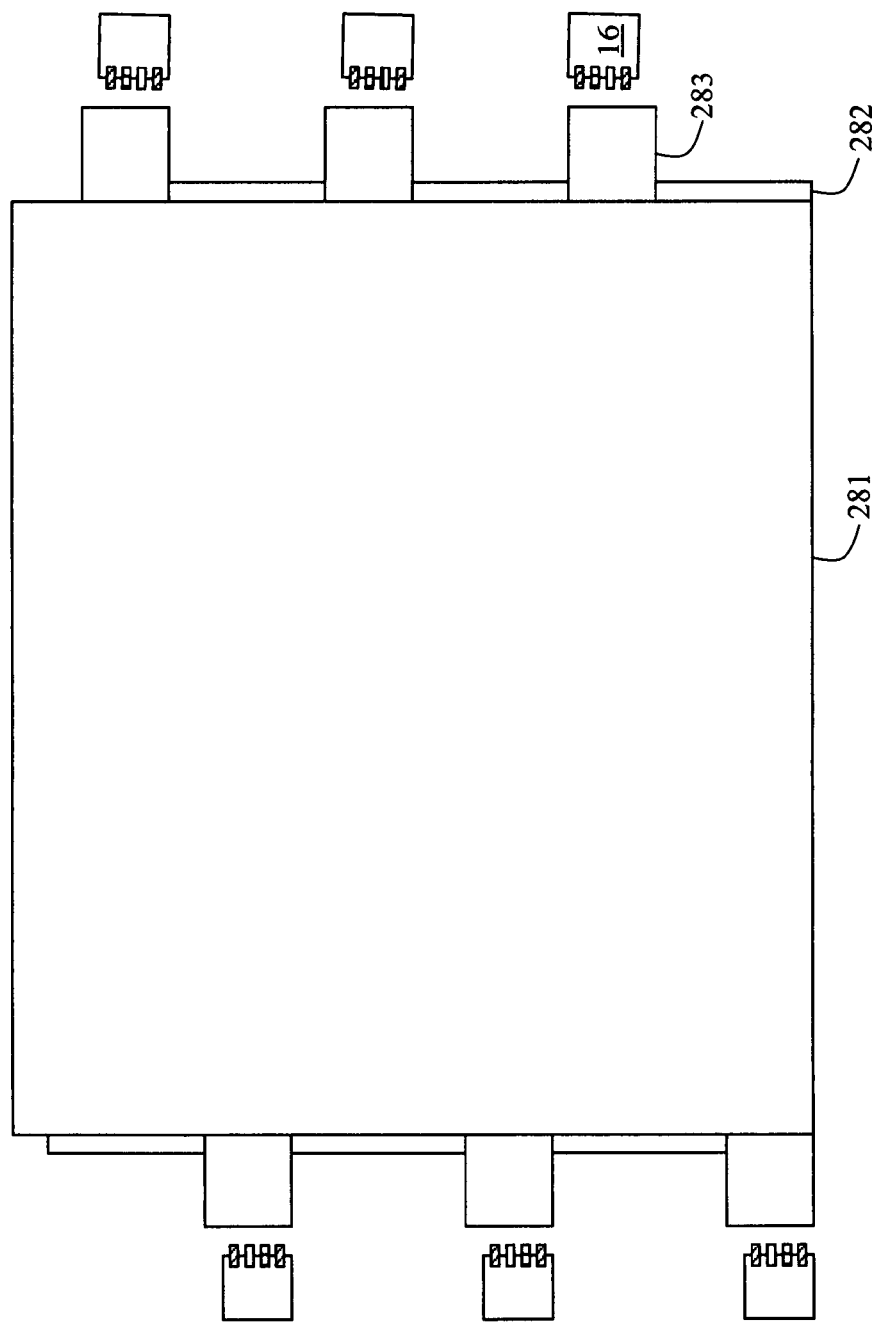
FIG. 28 is a lightguide plate with mixing tabs.

FIG. 28 is a top view of a lightguide plate 281 with light source 16 and mixing tabs 283 and reflective surface 282. Mixing tabs 283 provide for a means of mixing the individual colors from the lights LED light source to provide uniform white light prior to entering the lightguide plate. The mixing tabs have a light input surface that may be designed to capture as much light as possible from the light source. They may have an antireflective coating, and they may be contoured to capture more of the hemispherical light output from the LED's. There may also be optional side reflectors that cover part of the LED to help capture and redirect light into the lightguide plate. Opposite of the mixing tabs is a reflective surface to provide a means to maximize the light output of the lightguide plate. The reflectors may be a white scattering material or it may be specturally reflective. The reflector may have a smooth mirror-like surface or it may be roughen to aid in scattering. The lightguide plate may be a variety of configuration. The lightguide may have a featured on the non-view side to help in the redirection of light towards the view side. The featured surface may be a roughend surface, prisms, printed dots or other such means. Such features may be varied in their size, shape and density in order to provide uniform luminance across the length and width of the lightguide plate. The profile of the light guide may be uniform or tapered. It should be noted that while the above figure shows light input from both ends of the lightguide, other embodiments may have light input from only one end or from more than two ends.

Embodiment 29

Figure 29:
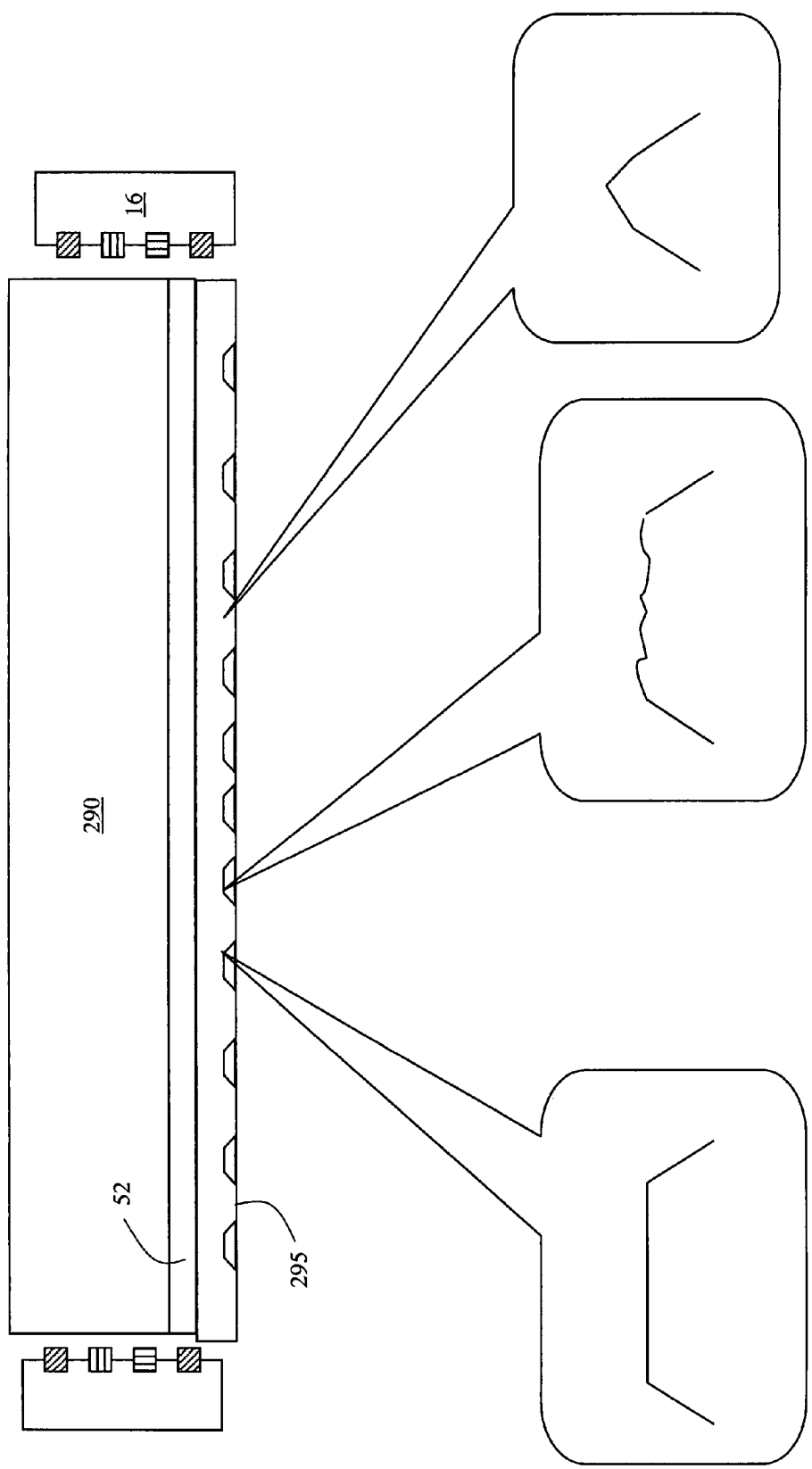
FIG. 29A is a elongated illuminator with circular holes
FIG. 29B is a light bar with triangular holes
FIG. 29C is a elongated illuminator with holes
FIG. 29D is a light bar

FIG. 29A, 29B and 29C are side view cross sections elongated illuminator 290 with a series of holes or indents 291, 292 and 293 that are formed in the non-view side. The elongated illuminators may be lit from one or both ends by light source 16. If lit from one end only, there may be a reflector on the end opposite the light source. The holes or indents may be any shape or size or may vary in shape and or size as a function of distance from the light source. In some embodiments the holes have the same relative size in the width and length dimensions. The features in general may be in the 1-300 micron size range in their depth although larger or slightly smaller may be desirable. The features are useful in scattering light and redirecting it towards the view side of the elongated illuminator. The elongated illuminator may be flat, tapered, round or other shape or compound shape. The holes or indents may be drilled, or replicated in the surface during molding or casting. For shallow holes it may be possible to use a laser. Other techniques may include the use of photo-patterning with a photo-resist and chemical etching. The indents and holes may be mechanically embossed with the assistance of heat and or pressure. As the holes are made deeper there may be problems with achieving good replication beyond 50-100 microns. Providing holes or indents with side wall with a rough surface may further enhance light redirection. There may be a light mixing section to provide improved light mixing uniformity. The spacing, density, size and shape may be varied to provide uniform lighting along the length of the elongated illuminator. While only a side view is shown in these figures, the side dimension may also vary in the number of features. The elongated illuminator may also provides means to more efficiently couple the light source into the elongated illuminator. These may include but is not limited to indented or recessed ends, reflectors, embedding the light source in a flexible media such as an adhesive, providing a lens to shape, collimate or otherwise direct the light as it exits the light source. Such a means helps to setup a TIR angle into the elongated illuminator to optimize the amount of light entering vs. the amount of light that exits the light source. Additionally the holes and indents as well as the other means of optimization the light bar may be applied to and used in a lightguide plate as well as a light bar or elongated illuminator Embodiment 30

FIG. 30A is a elongated illuminator arrangement with at least one prism shape light input end 15 on at lest one end, at least light source 16, a light extraction feature on the view side of the elongated illuminator 22 and a means of optically coupling the features with adhesive layer 52 and at optional reflective means 121 on the non-view side of the elongated illuminator. The reflective means 121 may be continuous or variable in its reflective properties to aid in uniform light illumination along the length of the elongated illuminator. There is also a small region near the light input ends where there is no extraction or reflective features (at least very minimal). Such a region is useful in providing color mixing.

FIG. 30B is a similar elongated illuminator arrangement but the prism on the prism shape light input ends covers the entire light input end. FIG. 1C is a further extension of the useful elongated illuminator of this invention where there are multiple prisms on the light input ends. FIG. 1D is a similar elongated illuminator arrangement but the prisms on the prism shape light input ends covers the entire light input end.

Embodiment 31

Figures 31A, 31B:
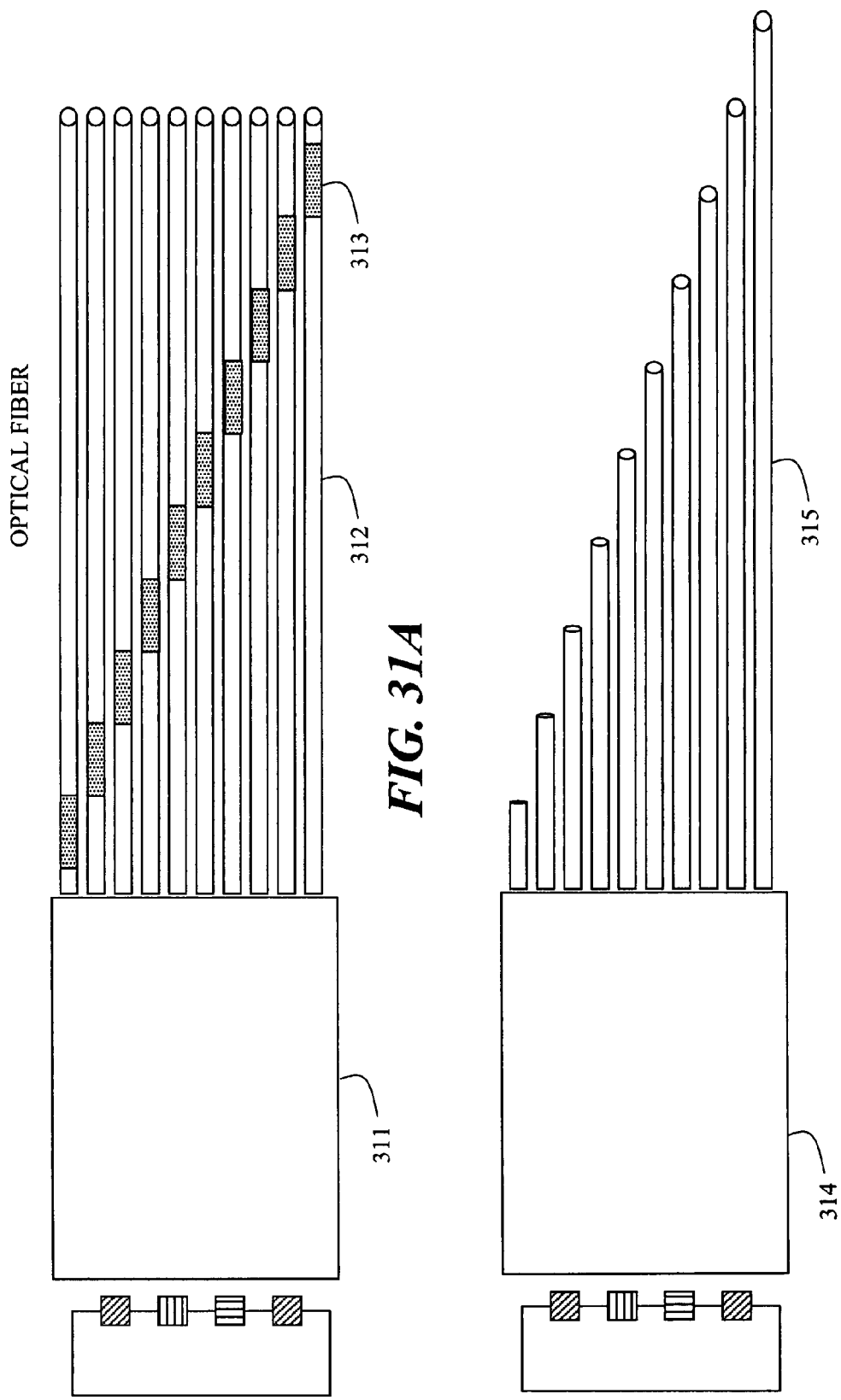
FIG. 31A is a light bar with optical fibers
FIG. 31B is a elongated illuminator with optical fibers of different lengths.

FIG. 31A is a side view cross section of a elongated illuminator 31 with a series of optical fibers 32. Each optical fiber has light extraction features 33 at different distance from light source.

FIG. 31B is a side view cross section of a elongated illuminator 31 with a series of optical fibers 32. Each optical fiber has different length.

EXAMPLES

One embodiment uses an acrylic light pipe as an elongated illuminator, nominally ¼ in. square in cross section. The light pipe is highly transparent and has an optical finish on all sides and ends of less than 25 nm. To form an elongated illuminator, a larger acrylic square bar (0.25"×0.25"×6 feet) was sawed into 14 inch segments and the ends were polished on a lathed. A piece of light extraction film was attached to one surface of elongated illuminator with UV epoxy, dispensed using a syringe to form a uniform narrow epoxy bead down the length of elongated illuminator. The adhesive was then cured under a UV lamp.

An LED array is used as the light source. Multi-die RGB LEDs are mounted in close proximity to the light channel. These multi-die LEDS consist of 1 red, 1 blue and 2 green die in a single package (OSRAM OSTAR Projection devices, type LE ATB A2A, from OSRAM, Inc.) These devices can be individually turned on, with the brightness of each die controlled by a separate current source.

Another embodiment of an elongated illuminator is shown in lengthwise cross-section in FIG. 10, not to scale. A series of printed white dots was applied to the non-view side of a tapered elongated illuminator using a micro-tip dispenser.

Other embodiments of this were also made by screen-printing a series of dot-like features on the non-view side of the tapered illuminator.

The light output was evaluated along the length of the bar with and without the addition of a light extraction film and also a prismatic turning film. In general it was found that the printed dot-like features provided good light uniformity. The light extraction film provided little additional benefit when used in combination with the printed dots and the turning film was found to have a narrow viewing angle.

A collimating linear Fresnel film with a focal length of approximately 2.5 inches) was placed over top of light channel with an air gap approximately equal to the focal length of the film. A series of photos demonstrated high brightness with good spatial uniformity. LEDs were lit individually to produce R, G, B illumination and then mixed together to form a well-mixed white LED light.

Incorporated herein by reference are U.S. Pat. No. 6,425,675; and U.S. Patent Application Nos. 2004/0223691 and US2004/0179776.

Example

The color uniformity of a light pipe configured as light channel according to the present invention was compared to the color uniformity of a light guide plate (LGP) for similar solid-state light sources. The light pipe was formed from PMMA and had a 6 mm square cross section and 245 mm length. A light extraction film was adhered to the top side of the light pipe. The light extraction film had prismatic features partly embedded into a layer of optical clear adhesive that forms regions of polymer next to regions of air. The adhesive (approximately 10 microns thick) was coated onto a sheet of polyester film. The polyester film was then adhered to the top side of the light pipe using an optically clear adhesive.

An array of LEDs was position on each end of the elongated illuminator. The output light was measured as it exited the elongated illuminator. A point approximately midway between the LEDs and near the widthwise center of the elongated illuminator (approximately 3 mm from an edge) was measured as. A second point near the edge was selected and compared in color uniformity to the center point.

For comparison, a light guide plate of the same material, thickness and length was selected. The width of the LGP was several times wider than the light pipe. The same type of light extraction film was applied to the LGP in a similar manner as described for the light pipe. The LGP used the same LED light sources on each end. A point midway between the LEDs was selected and also measured The elongated illuminator visually had better brightness and better uniformity over a comparable length of the light guide plate.

Additional examples of various solid waveguides with elongated illuminators FIGS. 4, 5A and 6 were also formed by machining slabs of PMMA (¼" thick) stock to the desired shape. These examples were compared for their relative stiffness to a series of elongated illuminators. In all cases the integral bridge between the illuminators provided a waveguide that had less sag than individual bars.

The invention has been described in detail with particular reference to certain preferred embodiments thereof, but it will be understood that variations and modifications can be effected within the spirit and scope of the invention. The patents and other publications referred to in this description are incorporated herein by reference in their entirety.

PARTS LIST 11 is a lightbar with bottom prism-like structure on the non-view side
12 is a prism-like structure
13 is the view side
14 is the non-view side (side opposite the view side).
15 is a light input end of a lightbar
16 is a solid state light source
21 is a variable density surface extraction feature
22 is a view side continuous surface extraction feature
23 is a variable density printed dot pattern on the side opposite of the view side
32 is an air gap
33 is an optional reflectors on the end opposite of the light input end
34 is an with connecting integral solid pathway
38 is a continuous light bar
39 is a is a serpentine like lightbar
40 is an end view of a light bar
41 is a tapered air gap
51 is a light extraction feature
52 is an adhesive layer
53 is an integral bridge connecting open spaces air gap
61 is an enlarged view of a tapered lightbar (non-view side)
71 is a view side slab
72 is a means of optically coupling
81 is a mixing section
83 is an angled segment with slope A
85 is an angled segment with slope b
90 is a tapered lightbar with a mixing section and with a prism-like structure on the non-view side
101 is a pattern of reflective dots
111 is a curved radius taper
121 is a reflective means
123 is a specularly reflective surface
124 is a scattering reflector
131 is a concave light entry surface
132 is an optional reflective that extends over the light source
133 is a convex light entry surface
141 is a descending (top to bottom) tapered light input surface
142 is a structured light redirection aid
151 is an optional antireflective light input surface
152 is a recessed area
153 is a light mixing section
154 is a reflective surface
161 is a tapered recessed light input section.
171 is trapezoidal wedge lightbar configuration is a wider view angle side than non-view angle side
173 is another design of a light bar
181 is a circular lightbar
182 is a mix section
183 tapered elongated section
184 is a reflector
185 is a circular lightbar with a flat view side surface
186 is a circular lightbar with a flat non-view surface
187 is a multi-facet lightbar
188 is a non-view side flat surface that has a series of light scattering features
189 is a non-view side surface that has a series of light scattering features in the arc of the lightbar
191 is a distribution cap
192 is lens-like surface structure
193 is a lightbar with a convex surface on the view side
194 is a lightbar with a view side flare
200 is a backlight
201 is a means of extracting light on more than one surface of a lightbar
202 is the region between the lightbars that provides redirecting the light.
210 is a another means of redirecting and spreading light in a backlight array
211 is a curved reflector region
221 is a shaped reflector
222 is a radius reflector
223 is a reflective base
230 is a backlight array 231 is a circular shaped reflector
232 is a hemispherical shaped reflector
241 is a trapezoidal shaped light bars
251 is an optical body that comprise polarization fiber
252 is a lenticular film
253 is a fresnel lens film
254 is a bulk diffuser
256 is a beaded diffuser
257 is a light enhancing film
258 is a reflective polarizer film
260 is a backlight array
261 is a lightbar
262 is a transparent adhesive layer
263 is a transparent plate
264 is a second transparent adhesive layer
265 is a prismatic feature
266 is a standoff
267 is a case or box with reflective surfaces
271 is a backlight array with curved lightbars in their end cross section
281 is a top vies of a light guide plate
282 is a reflective surface
283 is a mixing tab
290 is a light bar
291 is a series cylindrical holes or indents
292 is a series triangular holes of indents
293 is another type of hole or indent
295 is a lightbar with an optical film
301 is a prism shaped light input end
302 is a multiple prism light input end
311 is a lightbar
312 is an optical fiber
313 is a light extraction feature
314 is a lightbar
315 are optical fiber of different lengths

The invention claimed is:

1. A solid waveguide comprising opposite TIR surfaces further comprising: a) at least one light input surface for coupling light from a solid state light source; b) at least one mixing section; c) at least one light emitting surface; and d) a desired pattern of light redirecting features located on one TIR surface or between the TIR surfaces, and further comprising at least 2 additional TIR surfaces opposite to each other.

2. The solid waveguide of claim 1 further comprising at least one elongated illuminator.

3. The solid waveguide of claim 2 wherein said light mixing section is an integral part of said elongated illuminators.

4. The solid waveguide of claim 2 wherein said light mixing section is substantially free of the desired pattern of light directing features.

5. The solid waveguide of claim 2 wherein said light mixing section provides uniform color temperature for the light extraction area for the solid waveguide.

6. The solid waveguide of claim 2 wherein said at least one light input surface comprises at least one shape selected from the group consisting of flat, tapered, convex, concave, indented, multi-surfaced, partly reflecting, TIR adjusting.

7. The solid waveguide of claim 2 wherein said indents further comprises a means of adjusting the light to a critical TIR angle within said solid light guide.

8. The solid waveguide of claim 7 wherein said a means of adjusting the light to a critical TIR angle further comprises at least one selected from the group consisting of a reflector, a scatterer, and a prism.

9. The solid waveguide of claim 2 wherein said a desired pattern of light redirecting features comprises at least one selected from the group consisting of prisms, dots, reflectors, and changing slope.

10. The solid waveguide of claim 9 wherein said changing slope is on the side opposite of said at least one light-emitting surface.

11. The solid waveguide of claim 9 wherein said changing slope comprises at least one taper starting at the light guide side of said at least one mixing section.

12. The solid waveguide of claim 11 wherein said taper terminates at least in one location selected from the group consisting of the center, the opposite side of said at least one light emitting section, the opposite end of said light guide, and a reflector.

13. The solid waveguide of claim 11 wherein said taper comprises a radius.

14. The solid waveguide of claim 11 wherein said taper includes at least two different slopes.

15. The solid waveguide of claim 2 comprising at least one elongated illuminator further comprises a bridge connecting at least two elongated illuminators.

16. The solid waveguide of claim 1 further comprising at least one region with air.

17. The solid waveguide of claim 1 further comprising at least one elongated illuminator has an end cross sectional profile selected from the group consisting of square, rectangular, triangular, round.

18. The solid waveguide of claim 1 further comprising at least one elongated illuminator further comprises a region to spread light sideways towards said at least one light-emitting surface.

19. The solid waveguide of claim 2 wherein said at least one light-emitting surface is a view side.

20. The solid waveguide of claim 19 further comprising a region toward the elongated illuminator that includes a means of redirecting light substantially towards said light emitting surface.

21. The solid waveguide of claim 20 wherein said elongated illuminator comprises a means for side light emitting.

22. The solid waveguide of claim 1 wherein said elongated illuminator an optical fiber.

23. The solid waveguide of claim 1 wherein said elongated illuminator comprises regions of controlled light leakage.

24. The solid waveguide of claim 1 wherein said elongated illuminator further comprises a TIR cladding.

25. The solid waveguide of claim 1 further comprising at least one light mixing section substantially outside of the view area of the light guide.

26. The solid waveguide of claim 1 comprising a light source.

27. The solid waveguide of claim 1 comprising PMMA.

28. The solid waveguide of claim 2 wherein said at least one elongated illuminator has a length to input surface area ratio of greater than 100/1.

29. The solid waveguide of claim 1 wherein said at least one mixing section is from 20 to 60 mm in length.

30. The solid waveguide of claim 1 has an on-axis brightness of greater than 2000 cd/m$^2$.

31. The solid waveguide of claim 1 wherein the light from a solid state light source is redirected substantially normal to said at least one light emitting surface.

32. The solid waveguide of claim 2 wherein said at least one elongated illuminator has a brightness uniformity along its length of less than 10%.

33. A solid waveguide of claim 1 wherein said opposite TIR surfaces have a surface roughness Ra of less than 50 nm.

34. The solid waveguide of claim 1 wherein said solid state light source further comprises a heat sink.

35. The solid waveguide of claim 1 wherein the desired pattern of light redirecting features varies in at least one selected from the group consisting of height, density, size, location, included angle and roughness.

* * * * *